US012786830B2

(12) United States Patent
Park et al.

(10) Patent No.: US 12,786,830 B2
(45) Date of Patent: Nov. 3, 2026

(54) SWITCHING PROCESS WITH SUSPENSION INTERVAL FOLLOWING A HANDOVER PROCEDURE PERFORMED BY A UE

(71) Applicant: SHARP KABUSHIKI KAISHA, Sakai City (JP)

(72) Inventors: Kenneth James Park, Vancouver, WA (US); Atsushi Ishii, Vancouver, WA (US)

(73) Assignee: SHARP KABUSHIKI KAISHA, Sakai City (JP)

(*) Notice: Subject to any disclaimer, the term of this patent is extended or adjusted under 35 U.S.C. 154(b) by 314 days.

(21) Appl. No.: 18/687,953

(22) PCT Filed: Aug. 12, 2022

(86) PCT No.: PCT/JP2022/030740
§ 371 (c)(1),
(2) Date: Feb. 29, 2024

(87) PCT Pub. No.: WO2023/047837
PCT Pub. Date: Mar. 30, 2023

(65) Prior Publication Data

US 2024/0357443 A1 Oct. 24, 2024

Related U.S. Application Data

(60) Provisional application No. 63/247,566, filed on Sep. 23, 2021.

(51) Int. Cl.
*H04W 36/08* (2009.01)
*H04W 36/00* (2009.01)

(52) U.S. Cl.
CPC ....... *H04W 36/08* (2013.01); *H04W 36/0072* (2013.01)

(58) Field of Classification Search
CPC ............ H04W 36/08; H04W 36/0072; H04W 36/249; H04W 36/0064; H04W 36/185; H04W 8/183
(Continued)

(56) References Cited

U.S. PATENT DOCUMENTS

2023/0048297 A1* 2/2023 Lee ....................... H04W 24/08
2023/0396984 A1* 12/2023 Shrivastava .......... H04W 76/27
(Continued)

OTHER PUBLICATIONS

Vice Chairman (Nokia), "Report on LTE legacy, 71 GHz, DCCA, Multi-SIM and RAN slicing", R2-2108831, 3GPP TSG-RAN WG2 Meeting #115 electronic, Online, Aug. 2021.
(Continued)

*Primary Examiner* — Asad M Nawaz
*Assistant Examiner* — Michael Wayne Maddox
(74) *Attorney, Agent, or Firm* — ScienBiziP, P.C.

(57) ABSTRACT

A method for a user equipment (UE) is provided. The method includes the UE maintaining a first Radio Resource Control (RRC) connection with a first base station (BS) of a first network while receiving transmissions from a BS of a second network during at least one time period specified in a switch gap configuration. The UE receives an RRC reconfiguration message from the first BS that includes a first command and a second command. The first command instructs the UE to begin a handover procedure from the first BS to a second BS of the first network. The second command controls usage of the switch gap configuration by the UE. The UE initiates the handover procedure according to the first command. The UE may suspend reception of transmissions from the BS of the second network during a time interval following completion of the handover procedure based on the second command.

4 Claims, 13 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 2024/0107409 | A1* | 3/2024 | Da Silva ........... | H04W 36/0033 |
| 2024/0196195 | A1* | 6/2024 | Shrivastava .......... | H04W 72/21 |
| 2024/0196468 | A1* | 6/2024 | Velev .................... | H04W 76/15 |
| 2024/0260121 | A1* | 8/2024 | Bae ....................... | H04W 76/15 |

OTHER PUBLICATIONS

ETSI MCC, "Report of 3GPP TSG RAN WG2 meeting #114-e, Online", R2-2106901, 3GPP TSG-RAN WG2 meeting #115-e, May 19-27, 2021.
ETSI MCC, "Report of 3GPP TSG RAN WG2 meeting #113bis-e, Online", R2-2106641, 3GPP TSG-RAN WG2 meeting #114-e, Apr. 12-20, 2021.
ETSI MCC, "Report of 3GPP TSG RAN WG2 meeting #113-e, Online", R2-2102601, 3GPP TSG-RAN WG2 meeting #113bis-e, Jan. 25-Feb. 5, 2021.

* cited by examiner

700

```
-- ASN1START
-- TAG-OTHERCONFIG-START

OtherConfig ::=                 SEQUENCE {
    delayBudgetReportingConfig  CHOICE{
        release                 NULL,
        setup                   SEQUENCE{
            delayBudgetReportingProhibitTimer   ENUMERATED {s0, s0dot4, s0dot8, s1dot6, s3, s6, s12, s30}
        }
    }                                                                          OPTIONAL        -- Need M
}

OtherConfig-v1540 ::=           SEQUENCE {
    overheatingAssistanceConfig     SetupRelease {OverheatingAssistanceConfig}           OPTIONAL, -- Need M
    ...
}
CandidateServingFreqListNR-r16 ::= SEQUENCE (SIZE (1..maxFreqIDC-r16)) OF ARFCN-ValueNR

OtherConfig-v1610 ::=                   SEQUENCE {
    idc-AssistanceConfig-r16                SetupRelease {IDC-AssistanceConfig-r16}               OPTIONAL, -- Need M
    drx-PreferenceConfig-r16                SetupRelease {DRX-PreferenceConfig-r16}               OPTIONAL, -- Need M
    maxBW-PreferenceConfig-r16              SetupRelease {MaxBW-PreferenceConfig-r16}             OPTIONAL, -- Need M
    maxCC-PreferenceConfig-r16              SetupRelease {MaxCC-PreferenceConfig-r16}             OPTIONAL, -- Need M
    maxMIMO-LayerPreferenceConfig-r16       SetupRelease {MaxMIMO-LayerPreferenceConfig-r16}      OPTIONAL, -- Need M
    minSchedulingOffsetPreferenceConfig-r16 SetupRelease {MinSchedulingOffsetPreferenceConfig-r16} OPTIONAL, -- Need M
    releasePreferenceConfig-r16             SetupRelease {ReleasePreferenceConfig-r16}            OPTIONAL, -- Need M
    referenceTimePreferenceReporting-r16    ENUMERATED {true}                                     OPTIONAL,  -- Need R
    btNameList-r16                          SetupRelease {BT-NameList-r16}                        OPTIONAL, -- Need M
    wlanNameList-r16                        SetupRelease {WLAN-NameList-r16}                      OPTIONAL, -- Need M
    sensorNameList-r16                      SetupRelease {Sensor-NameList-r16}                    OPTIONAL, -- Need M
    obtainCommonLocation-r16                ENUMERATED {true}                                     OPTIONAL,  -- Need R
    sl-AssistanceConfigNR-r16               ENUMERATED{true}                                      OPTIONAL -- Need R
}


OtherConfig-v1700 ::=                   SEQUENCE {
    switchSuspendIntervalValue-r17         INTEGER (0..maxSwitchSuspendIntervalValue)            OPTIONAL -- Need R
    ...
}

......Note: remaining text omitted for brevity......

}

-- TAG-OTHERCONFIG-STOP
-- ASN1STOP
```

FIG. 7

800A

```
-- ASN1START
-- TAG-RRCRECONFIGURATION-START

RRCReconfiguration ::=              SEQUENCE {
    rrc-TransactionIdentifier           RRC-TransactionIdentifier,
    criticalExtensions                  CHOICE {
        rrcReconfiguration                  RRCReconfiguration-IEs,
        criticalExtensionsFuture            SEQUENCE {}
    }
}

RRCReconfiguration-IEs ::=          SEQUENCE {
    radioBearerConfig                   RadioBearerConfig                               OPTIONAL, -- Need M
    secondaryCellGroup                  OCTET STRING (CONTAINING CellGroupConfig)       OPTIONAL, -- Cond SCG
    measConfig                          MeasConfig                                      OPTIONAL, -- Need M
    lateNonCriticalExtension            OCTET STRING                                    OPTIONAL,
    nonCriticalExtension                RRCReconfiguration-v1530-IEs                    OPTIONAL
}

RRCReconfiguration-v1530-IEs ::=        SEQUENCE {
    masterCellGroup                     OCTET STRING (CONTAINING CellGroupConfig)       OPTIONAL, -- Need M
    fullConfig                          ENUMERATED {true}                               OPTIONAL, -- Cond
    dedicatedNAS-MessageList            SEQUENCE (SIZE(1..maxDRB)) OF DedicatedNAS-Message OPTIONAL, -- Cond
    masterKeyUpdate                     MasterKeyUpdate                                 OPTIONAL, -- Cond
    dedicatedSIB1-Delivery              OCTET STRING (CONTAINING SIB1)                  OPTIONAL, -- Need N
    dedicatedSystemInformationDelivery  OCTET STRING (CONTAINING SystemInformation)     OPTIONAL, -- Need N
    otherConfig                         OtherConfig                                     OPTIONAL, -- Need M
    nonCriticalExtension                RRCReconfiguration-v1540-IEs                    OPTIONAL
}

RRCReconfiguration-v1540-IEs ::=    SEQUENCE {
    otherConfig-v1540                   OtherConfig-v1540                               OPTIONAL, -- Need M
    nonCriticalExtension                RRCReconfiguration-v1560-IEs                    OPTIONAL
}

RRCReconfiguration-v1560-IEs ::=     SEQUENCE {
    mrdc-SecondaryCellGroupConfig        SetupRelease { MRDC-SecondaryCellGroupConfig }  OPTIONAL,   -- Need M
    radioBearerConfig2                   OCTET STRING (CONTAINING RadioBearerConfig)     OPTIONAL,   -- Need M
    sk-Counter                           SK-Counter                                      OPTIONAL,   -- Need N
    nonCriticalExtension                 RRCReconfiguration-v1610-IEs                    OPTIONAL
}
```

FIG. 8A

800B

```
RRCReconfiguration-v1610-IEs ::=        SEQUENCE {
    otherConfig-v1610                       OtherConfig-v1610                                        OPTIONAL, -- Need M
    bap-Config-r16                          SetupRelease { BAP-Config-r16 }                          OPTIONAL, -- Need M
    iab-IP-AddressConfigurationList-r16     IAB-IP-AddressConfigurationList-r16                      OPTIONAL, -- Need M
    conditionalReconfiguration-r16          ConditionalReconfiguration-r16                           OPTIONAL, -- Need M
    daps-SourceRelease-r16                  ENUMERATED{true}                                         OPTIONAL, -- Need N
    t316-r16                                SetupRelease {T316-r16}                                  OPTIONAL, -- Need M
    needForGapsConfigNR-r16                 SetupRelease {NeedForGapsConfigNR-r16}                   OPTIONAL, -- Need M
    onDemandSIB-Request-r16                 SetupRelease { OnDemandSIB-Request-r16 }                 OPTIONAL, -- Need M
    dedicatedPosSysInfoDelivery-r16         OCTET STRING (CONTAINING PosSystemInformation-r16-IEs)  OPTIONAL, -- Need N
    sl-ConfigDedicatedNR-r16                SetupRelease {SL-ConfigDedicatedNR-r16}                  OPTIONAL, -- Need M
    sl-ConfigDedicatedEUTRA-Info-r16        SetupRelease {SL-ConfigDedicatedEUTRA-Info-r16}          OPTIONAL, -- Need M
    targetCellSMTC-SCG-r16                  SSB-MTC                                                  OPTIONAL, -- Need S
    nonCriticalExtension                    RRCReconfiguration-v1700-IEs                             OPTIONAL
}

RRCReconfiguration-v1700-IEs ::=        SEQUENCE {
    otherConfig-v1700                      OtherConfig-v1700                                         OPTIONAL, -- Need N
    nonCriticalExtension                   SEQUENCE {}                                               OPTIONAL
}

......Note: remaining text omitted for brevity......

-- TAG-RRCRECONFIGURATION-STOP
-- ASN1STOP
```

FIG. 8B

900

```
-- ASN1START
-- TAG-MULTIPLICITY-AND-TYPE-CONSTRAINT-DEFINITIONS-START

maxAI-DCI-PayloadSize-r16            INTEGER ::= 128     --Maximum size of the DCI payload scrambled with ai-RNTI
maxAI-DCI-PayloadSize-r16-1          INTEGER ::= 127     --Maximum size of the DCI payload scrambled with ai-RNTI minus 1
maxBandComb                          INTEGER ::= 65536   -- Maximum number of DL band combinations
maxBandsUTRA-FDD-r16                 INTEGER ::= 64      -- Maximum number of bands listed in UTRA-FDD UE caps

maxSwitchSuspendIntervalValue        INTEGER ::= 1000    -- Maximum interval of Switch Suspend interval

......Note: remaining text removed for brevity......

-- TAG-MULTIPLICITY-AND-TYPE-CONSTRAINT-DEFINITIONS-STOP
-- ASN1STOP
```

FIG. 9

SWITCHING PROCESS WITH SUSPENSION INTERVAL FOLLOWING A HANDOVER PROCEDURE PERFORMED BY A UE

CROSS REFERENCE

This Nonprovisional application claims priority under 35 U.S.C. § 119 on provisional Application No. 63/247,566 on Sep. 23, 2021, the entire contents of which are hereby incorporated by reference.

TECHNICAL FIELD

The present disclosure generally relates to wireless communications and more specifically relates to suspending a switching process for a time interval following a handover of a user equipment (UE) between base stations (e.g., Next Generation NodeBs (gNBs)) of a wireless network (e.g., a fifth generation (5G) (e.g., New Radio (NR)) network).

BACKGROUND ART

As employed on a mobile telephony device (e.g., mobile phone, satellite phone, smart watch, computer, camera, and so on), a Subscriber Identity Module (SIM) card is an integrated circuit running a Card Operating System (COS) that is intended to securely store the International Mobile Subscriber Identity (IMSI) number and its related encryption key for the device. This number and key are used to identify and authenticate the associated subscriber of a mobile communication network supporting the device.

A Universal Subscriber Identity Module (USIM) is the functional equivalent of a SIM in that it stores subscriber-related information. Additionally, a USIM operates as a miniature computer that may handle several miniature applications, such as the implementation of enhanced security functions pertaining to authentication and ciphering on the user side in mobile telephony devices.

In some cases, a mobile telephony device, which may be more generally referred to as a user equipment (UE), may be a multiple-USIM (Multi-USIM or MUSIM) device. In the consumer market, some commercially deployed UEs support a configuration with more than one USIM (e.g., typically two USIMs), each of which may be associated with the same or a different network. Support for a MUSIM device is conventionally handled in an implementation-specific manner without any support from 3rd Generation Partnership Project (3GPP) specifications, resulting in a variety of implementations. An implementation-specific MUSIM device typically uses common radio and baseband components that are shared among the multiple USIMs and under the control of a single processor, which may lead to issues that negatively impact 3GPP system performance.

For example, while actively communicating with a first network associated with a first USIM (USIM-A), the UE may occasionally check a second network associated with a second USIM (USIM-B) (e.g., to monitor the paging channel, detect a Synchronization Signal Block (SSB), perform signal measurements, or read system information) and decide, for example, if the UE should respond to a paging request from the other system. This occasional activity on the second network may or may not have any performance impact, depending on the UE implementation.

Paging Occasions (POs) are typically calculated based on the UE identifier (e.g., IMSI and 5G Serving Temporary Mobile Subscriber Identity (5G-S-TMSI) for Evolved Packet System (EPS) and 5G System (5GS), respectively). In some cases, the UE identifier values associated with the different USIMs may lead to systematic collisions that may result in missed pages (e.g., a page on the first network associated with USIM-A occurs at, or nearly at, the same time as a page on the second network associated with USIM-B).

Further, when the UE receives a page on the second network, the UE may be configured to decide whether to respond to the page (e.g., by following user-configured rules). In the absence of information indicating the service type that has triggered the paging (e.g., voice or data service), the UE may have to blindly decide whether to ignore or respond to the page.

Thereafter, in cases in which the UE decides to respond to the page in the second network, or when the UE is required to perform some signaling activity (e.g., Periodic Mobility Registration Update) in the second network, the UE may be required to stop its current activity in the first network. In the absence of any procedure for suspension of the ongoing activity, the UE may autonomously release the Radio Resource Control (RRC) connection with the first network and abruptly leave the network. Such release is likely to be interpreted by the first network as an error case, which may distort connection statistics in the first network and thus misguide algorithms that rely on the statistics. Moreover, during the UE's absence, the first network may keep paging the UE, which may result in wasting paging resources.

Currently, the 3GPP is addressing the functionality of a Multi-USIM device as the functionality pertains to the coordinated operation of the device in and with a 3GPP network. As such functionality may impact the physical layer, radio protocol, and radio architecture enhancements, as well as Service and System Aspects (SAs), the issue is being addressed in the 3GPP Technical Specification Group (TSG) SA Working Group 1 (WG1) (referred to as SA1), 3GPP TSG SA WG2 (SA2), and 3GPP TSG RAN WG2 (RAN2) working groups.

As a result of this work, in some proposals, a UE may be configured to switch its communication resources from a first network to a second network (referred to as "network switching" or more simply "switching") to facilitate MUSIM functionality. When switching from a first network to a second network, the UE may tune its receiver/transmitter away from the time and frequency resources associated with the first network to the time and frequency resources associated with the second network. Switching functionality may be enabled by a configuration of the UE, where the UE may access the time and frequency resources of the first network as associated with a first USIM and the time and frequency resources of the second network as associated with a second USIM of the UE in a time-division-multiplexed (TDM) manner.

Currently, two kinds of switching procedures have been proposed. According to the first procedure, the UE may tune away from a gNB of the first network to a gNB of the second network for short periods of time. Such periods are known by the UE and by the gNB of the first network to be sufficiently short such that the UE may tune, receive, and decode paging occasions and other network type information from the gNB of the second network and then retune back to the gNB of the first network within such a period of time that the gNB of the first network does not experience Radio Link Failure (RLF) and/or Beam Failure Detection (BFD) with the UE. The network type information may include, for example, System Information (SI) receiving, Synchronization Signal Block (SSB) detection, serving cell and neighboring cell signal measurement (e.g.,intra-frequency, inter-frequency, and inter-radio-access-technology (inter-RAT) measurement). Such switching is referred to as "Switching Without Leaving RRC_CONNECTED", or simply "Switching Without Leaving".

According to the second switching procedure, the UE may tune away from the gNB of the first network to use time and frequency resources of the gNB of the second network for periods of time that are sufficiently long and continuous in duration that the UE cannot maintain a connection to the gNB of the first network without the gNB of the first network experiencing RLF and/or BFD. Thus, the UE must leave the RRC_CONNECTED state associated with the gNB of the first network before switching to the gNB of the second network. Such switching is known as "Switching with Leaving RRC_CONNECTED", or simply "Switching with Leaving".

For the case of Switching Without Leaving, the UE may know the duration and periodicity of paging occasions and other network type information events that occur with the gNB of the second network. Thus, to assist the UE in receiving the periodic network type information from the gNB of the second network, the UE may request the gNB of the first network to not schedule any uplink (UL) or downlink (DL) time and frequency resources during one or more periods of time when the UE intends to receive/transmit information on the gNB of the second network. The term "gap" is used to define such a period of time when the gNB of the first network does not schedule any UL or DL time and frequency resources for the UE. Accordingly, the aforementioned period of time allows the UE to omit interactions (e.g., receiving/transmitting data) with the gNB of the first network. The gap may delimit a period of time during which the UE may be busy receiving and/or transmitting data from/to a gNB of another cell and/or network. For the purposes of this disclosure, a gap in the UL or DL time and frequency resources of a gNB of a first network may be scheduled to provide the UE with the opportunity to switch from the gNB of the first network to a gNB of the second network for a scheduled period of time that aligns with transmissions of network information of the second network. In some examples, a gap may be scheduled by a gNB of a network to reoccur at a fixed periodicity.

As proposed in greater detail below, a gap schedule between the UE and the gNB of the first network may be subsequently employed between the UE and a second gNB of the first network during and/or after a handover of the UE from the first gNB to the second gNB, thus possibly facilitating an efficient use of time and frequency resources at least through the handover process. However, employing the gap schedule immediately after completion of the handover process may interfere with the transfer of data between the second gNB of the first network and the UE that was not previously transported, and thus is buffered or queued at the network or the UE, during the execution of the handover. This interference may significantly exacerbate data transfer latency that typically results from a handover process while attempting to efficiently employ the use of Switching Without Leaving after the handover.

SUMMARY OF INVENTION

In one example, a user equipment (UE), comprising: one or more non-transitory computer-readable media having computer-executable instructions embodied thereon; and at least one processor coupled to the one or more non-transitory computer-readable media and configured to execute the computer-executable instructions to: while maintaining a first Radio Resource Control (RRC) connection with a first base station (BS) of a first network, receive transmissions from a BS of a second network during at least one time period specified in a switch gap configuration; receive an RRC reconfiguration message from the first BS of the first network, the RRC reconfiguration message comprising a first command and a second command, the first command instructing the UE to begin a handover procedure from the first BS of the first network to a second BS of the first network, and the second command controlling usage of the switch gap configuration by the UE following completion of the handover procedure; initiate execution of the handover procedure according to the first command; and when the second command suspends continued usage of the switch gap configuration during a time interval following the completion of the handover procedure, suspend reception of transmissions from the BS of the second network during the time interval.

In one example, a base station (BS) of a first network, the BS comprising: one or more non-transitory computer-readable media having computer-executable instructions embodied thereon; and at least one processor coupled to the one or more non-transitory computer-readable media and configured to execute the computer-executable instructions to: maintain a first Radio Resource Control (RRC) connection with a user equipment (UE) while facilitating gaps in communication with the UE according to a switch gap configuration; and transmit, to the UE, an RRC reconfiguration message comprising a first command and a second command, the first command instructing the UE to begin a handover procedure from the BS of the first network to another BS of the first network, and the second command controlling usage of the switch gap configuration by the UE following completion of the handover procedure.

In one example, a base station (BS) of a first network, the BS comprising: one or more non-transitory computer-readable media having computer-executable instructions embodied thereon; and at least one processor coupled to the one or more non-transitory computer-readable media and configured to execute the computer-executable instructions to: receive, from another BS of the first network, a handover request message for a user equipment (UE), the handover request message comprising a switch gap configuration that specifies at least one time period during which the UE receives transmissions from a BS of a second network; generate an RRC reconfiguration message comprising a first command and a second command, the first command instructing the UE to begin a handover procedure from the other BS of the first network to the BS of the first network, and the second command controlling usage of the switch gap configuration by the UE following completion of the handover procedure; and transmit, to the other BS, a handover request acknowledgment message comprising the RRC reconfiguration message.

BRIEF DESCRIPTION OF DRAWINGS

Implementations of the present technology will now be described, by way of example only, with reference to the attached figures.

FIG. 7 illustrates an example of a new Other Configuration (otherConfig) information element (IE), according to an example implementation of the present disclosure.

FIG. 8A illustrate an example of a new RRC Reconfiguration (RRCReconfiguration) IE, according to an example implementation of the present disclosure.

FIG. 8B illustrate an example of a new RRC Reconfiguration (RRCReconfiguration) IE, according to an example implementation of the present disclosure.

FIG. 9 illustrates an example of a new RRC Multiplicity and Type Constraint definition (maxSwitchSuspendIntervalValue), according to an example implementation of the present disclosure.

DESCRIPTION OF EMBODIMENTS

Figure 1:
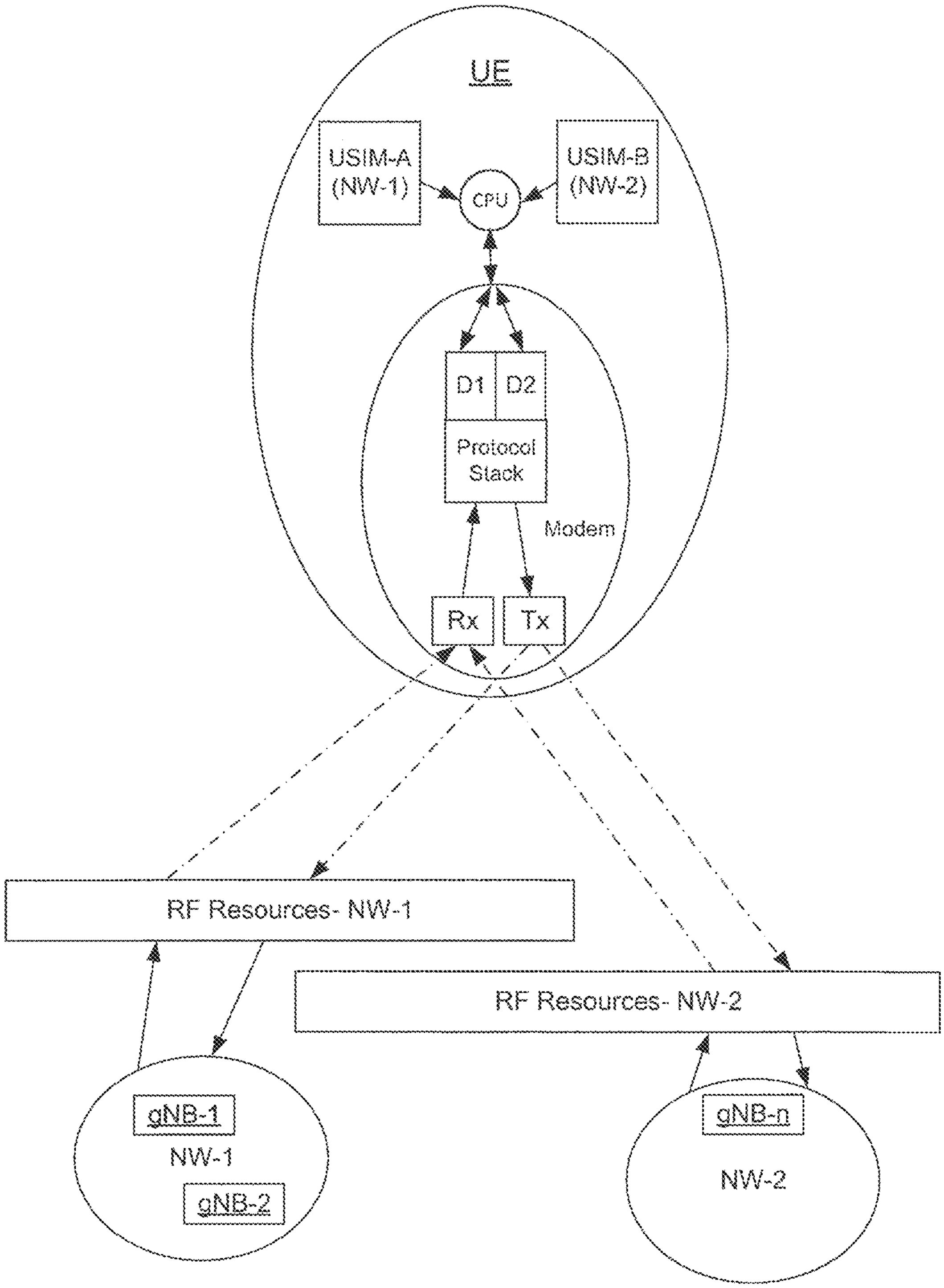
FIG. 1 illustrates a block diagram of a MUSIM UE in communication with gNBs of two different networks, according to an example implementation of the present disclosure.

The 3GPP is a collaboration agreement that aims to define globally applicable technical specifications and technical reports for third and fourth generation wireless communication systems. The 3GPP may also define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14, 15, and so on) including New Radio (NR) which is also known as 5G. However, the scope of the present disclosure should not be limited in this regard. At least some aspects of the systems and methods disclosed herein may be utilized in other types of wireless communication systems.

A wireless communication device may be an electronic device used to communicate voice and/or data to a base station (BS), which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices may include cellular phones, smart phones, personal digital assistants (PDAs), laptop computers, netbooks, e-readers, wireless modems, etc.

In the 3GPP specifications, a wireless communication device may typically be referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In the 3GPP specifications, a BS is typically referred to as a NodeB, an evolved NodeB (eNB), a home enhanced or evolved NodeB (HeNB), a Next Generation NodeB (gNB) or some other similar terminology. As the scope of the disclosure should not be limited to 3GPP standards, the terms "base station," "NodeB," "eNB," "HeNB," and "gNB" may be used interchangeably herein to mean the more general term "base station." Furthermore, the term "base station" or "BS" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB and/or gNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in the E-UTRA and E-UTRAN overall description, as used herein, a "cell" may be defined as a "combination of downlink and optionally uplink resources." The linking between the carrier frequency of the downlink resources and the carrier frequency of the uplink resources may be indicated in the system information transmitted on the downlink resources.

"Configured cells" are those cells of which the UE is aware and is allowed by an eNB and/or gNB to transmit or receive information. "Configured cell(s)" may be serving cell(s). The UE may receive system information and perform the required measurements on all configured cells. "Configured cell(s)" for a radio connection may include a primary cell and/or no, one, or more secondary cell(s).

"Activated cells" are those configured cells on which the UE is transmitting and receiving. That is, activated cells are those cells for which the UE monitors the physical downlink control channel (PDCCH) and, in the case of a downlink transmission, those cells for which the UE decodes a physical downlink shared channel (PDSCH). "Deactivated cells" are those configured cells for which the UE is not monitoring the transmission of PDCCH. It should be noted that a "cell" may be described in terms of differing dimensions. For example, a "cell" may have temporal, spatial (e.g., geographical), and frequency characteristics.

The 5G communication systems, dubbed NR technologies by the 3GPP, envision the use of time/frequency/space resources to allow for services, such as Enhanced Mobile Broadband (eMBB) transmission, Ultra-Reliable Low-Latency Communications (URLLC) transmission, and massive Machine Type Communication (mMTC) transmission. Also, in NR, single-beam and/or multi-beam operations are considered for downlink and/or uplink transmissions.

Various examples of the systems and methods disclosed herein are now described with reference to the figures, where like reference numbers may indicate functionally similar elements. The systems and methods as generally described and illustrated in the Figures herein could be arranged and designed in a wide variety of different implementations. Therefore, the detailed description of the present disclosure as illustrated in the figures is not intended to limit scope of the present disclosure but is merely representative of the systems and methods.

According to various implementations of the present disclosure, a mechanism is discussed by which a "gap configuration" (or, as also used below, a "switch gap configuration") specifying one or more gaps scheduled between a UE and a first gNB of a first network, as described above, may be transported from the first gNB to a second gNB of the first network as part of a handover operation. More specifically, a switch gap configuration may include data specifying one or more time periods, or "gaps", when the gNB of the first network does not schedule any UL or DL time and frequency resources for the UE. Accordingly, the aforementioned periods of time may allow the UE to omit interactions (e.g., receiving and/or transmitting of data) with the gNB of the first network (e.g., such that the UE may employ those time periods to "switch" to a gNB of a second network to receive paging and other information). Such implementations may thus facilitate use of the gaps by the UE during and/or after the handover operation, thus retaining the efficiency associated with the Switching Without Leaving procedure during that time.

However, under some circumstances, allowing such switching after the completion of a handover operation may negatively impact data transfer latency in the short term. For example, a significant amount of data may have been buffered by the UE and/or the first gNB of the first network during the handover operation (e.g., while the UE was not connected to either the first gNB or the second gNB). Consequently, in some implementations described below, to facilitate an efficient transfer of data after completion of the handover operation, switching operations may be suspended for some period of time to increase the number of UL or DL frequency and time resources provided by the second gNB immediately after completion of the handover operation.

The term "handover" may herein refer to a procedure performed jointly by a UE and a wireless network to switch/change at least one serving cell serving the UE to another cell during a connected state (e.g., RRC_CONNECTED state). The at least one serving cell may include, but is not limited to, a primary cell (PCell), a secondary cell (SCell), a primary secondary cell (PSCell), or a combination thereof. Such a serving cell may be a part/member of a master cell group (MCG) or a secondary cell group (SCG).

FIG. 1 illustrates a block diagram of a MUSIM UE in communication with gNBs of two different networks, according to an example implementation of the present disclosure. As depicted in FIG. 1, the UE may include a first USIM (USIM-A) to identify the UE with a first network NW-1 (or, alternately, NW-A), as well as a second USIM (USIM-B) to identify the UE with a second network NW-2 (or, alternately, NW-B). Further, first network NW-1 may include a first gNB (gNB-1) and a second gNB (gNB-2), and second network NW-2 may include a gNB (gNB-n). In other implementations, a greater number of gNBs may be included in either or both of first network NW-1 and second network NW-2.

In further reference to FIG. 1, the UE may also include at least one central processing unit (CPU) or other processor that is communicatively coupled to USIM-A and USIM-B to facilitate communication with first network NW-1 and second network NW-2, respectively, by way of a modulator/demodulator (modem) unit. The modem may include at least one transmitter (Tx) and at least one receiver (Rx) for communicating with first network NW-1 and second network NW-2 over radio frequency (RF) resources (e.g., time and frequency resources) corresponding to each network NW-1 and NW-2. The modem may also include a communication protocol stack in communication with transmitter Tx and receiver Rx, as well as two data processing regions D1 and D2 associated with first network NW-1 and second network NW-2, respectively. The UE may also include memory that is coupled to the at least one processor and that stores instructions that are executable by the at least one processor to perform various operations of the UE discussed herein. Other portions of the UE (e.g., a touchscreen, a microphone, a speaker, and so on that may receive or present data associated with data processing regions D1 and D2) are not explicitly depicted in FIG. 1.

To facilitate discussion in portions of the description below, first gNB-1 of first network NW-1 (as shown in FIG. 1) is referred to as gNB-1_NW-1, second gNB-1 of first network NW-1 is referred to as gNB-2_NW-1, and gNB-n of second network NW-2 is referred to as gNB-n_NW-2. In some implementations, each gNB may include at least one transmitter, at least one receiver, at least one processor, and memory that is coupled to the at least one processor and that stores instructions that are executable by the at least one processor to perform various operations of the gNB, as discussed herein.

In some implementations, the UE may accomplish a request for one or more gaps by sending gNB-1_NW-1 a Gap Configuration Assistance Information Message via an IE (e.g., a new IE called switchGapConfig). The transport of the switchGapConfig IE to gNB-1_NW-1 may be provided by UL-DCCH-Message::UEAssistanceInformation. In some implementations, the format of switchGapConfig may be derived from an existing IE (e.g., the measGapConfig IE, as described in Technical Specification (TS) 38.331), such as by employing various parameters sufficient to identify and request one or more time intervals or periods during which UL and DL time and frequency resources for the UE are not to be scheduled by a gNB (e.g., gNB-1_NW-1, for the purpose of paging, receiving system information, and so on with gNB-n_NW-2).

In some implementations, the gaps requested in a Gap Configuration Assistance Information Message may be any of three types: "Periodic Gap", "A-periodic Gap", and "Autonomous Gap". A Periodic Gap may provide for a repeating period of time (e.g., establishing a pattern) where a gNB does not schedule any UL or DL time and frequency resources for the UE. An A-periodic Gap may provide for a single period of time where a gNB does not schedule any UL or DL time and frequency resources for the UE. An Autonomous Gap may indicate that the network does not configure gaps for the UE. The Gap Configuration Assistance Information Message may include multiple gap requests (e.g., two different Periodic gap patterns, or one Periodic gap pattern and one a-periodic gap, or other combinations).

In some implementations, the information provided by the UE to a gNB of first network NW-1 about a switching gap configuration via the Gap Configuration Assistance Information Message may include information about the starting time of the gap (e.g., expressed as an offset value or start System Frame Number (SFN), and a subframe), the gap length, and the gap repetition period. However, as the timing of the transmission of network resources between different networks may not be the same, the UE may map the timing information of the gap relative to a gNB of second network NW-2 (e.g., gNB-n_NW-2) onto the timing of the gNB of first network NW-1 (e.g., gNB-1_NW-1). Accordingly, the request to gNB-1_NW-1 may be in the form of mapped timing values of gNB-n_NW-2.

As a result of the Gap Configuration Assistance Information Message provided by the UE to gNB-1_NW-1, in some implementations, gNB-1_NW-1 may in turn provide the UE with a Gap Configuration Assistance Information Response Message (e.g., via the switchGapConfig IE, as described above). The switchGapConfig IE may include one or more switch gap configurations for the switching process. The transport of the switchGapConfig IE to the UE may be provided by DL-DCCH::RRCReconfiguration.OtherConfig. The one or more switch gap configurations provided in a Gap Configuration Assistance Information Response Message may include any of the three types discussed above: Periodic Gap, A-periodic Gap, and/or Autonomous Gap. The Gap Configuration Assistance Information Response Message may include one or more gap results. For example, the one or more switch gap configurations may define one or more gaps (e.g., periodic, a-periodic, and/or autonomous gaps) where gNB-1_NW-1 will not assign the UE any UL/DL time and frequency resources, and thus the UE may tune away from gNB-1_NW-1 during those gaps to receive information from gNB-n_NW-2 and not miss receiving DL data or miss transmitting UL data with gNB-1_NW-1. In some implementations, the gaps may be synchronized to the NR/LTE frame structure.

As a result, if the UE is actively Switching Without Leaving gNB-1_NW-1 to receive paging and other signaling on gNB-n_NW-2, then the gaps in the gNB-1_NW-1 gap schedule of transmission/reception resources may enable the UE to switch to gNB-n_NW-2 without missing scheduled transmission/reception resources of gNB-1_NW-1. The gap schedules may be based upon the one or more switch gap configurations that were previously agreed to by both the UE and gNB-1_NW-1.

In some situations, however, if the UE is handed over from gNB-1_NW-1 to a second gNB of first network NW-1 (e.g., gNB-2_NW-1) and the UE is actively Switching Without Leaving gNB-1_NW-1 to receive paging and other system information via gNB-n_NW-2, then upon reception of a command by the UE to engage in a handover operation (e.g., via a RRCReconfiguration message) from gNB-1_NW-1 to gNB-2_NW-1, the UE may be compelled to terminate the switching procedure between gNB-1_NW-1 and gNB-n_NW-2, as gNB-2_NW-1 does not possess a copy of the previously generated one or more switch gap configurations that could otherwise be used by gNB-2_NW-1 to create gaps in the transmission and/or reception resources scheduled for the UE by gNB-2_NW-1 during or following the handover. For example, such gaps may be employed to provide the UE with opportunities to Switch Without Leaving gNB-2_NW-1 to receive paging and other information via gNB-n_NW-2.

In some cases, the termination of the switching procedure by a concurrent handover process may cause the UE to miss pages on gNB-n_NW-2 until the UE can restart the switching procedure between the UE and gNB-2_NW-1 following the successful completion of the handover process. In addition, to restart the switching procedure between the UE and gNB-2_NW-1 after the handover, the UE may acquire one or more new switch gap configurations from gNB-2_NW-1, which may force the UE to send a Gap Configuration Assistance Information Message representing the timing of periodic and aperiodic network type information of gNB-n_NW-2 to gNB-2_NW-1 such that gNB-2_NW-1 may reply to the UE with the one or more new switch gap configurations. However, such a request by the UE to gNB-2_NW-1 subsequent to the handover may represent a waste of resources, as the one or more switch gap configurations received from gNB-2_NW-1 subsequent to the handover may be the same as those received by the UE from gNB-1_NW-1 prior to the handover from gNB-1_NW-1, because the one or more switch gap configurations from gNB-1_NW-1 and from gNB-2_NW-1 may be based on the same timing of periodic and aperiodic network type information of gNB-n_NW-2. Consequently, various implementations of the present disclosure may facilitate the sharing of the previously generated switch gap configuration information with gNB-2_NW-1.

Additionally, as mentioned above, the handover process may cause both the UE and the network to experience a first time period during which DL data from the network and UL data from the UE cannot be transported. In some examples, the first time period may begin with the termination of the connection of the UE to the source gNB (gNB-1_NW-1) and ending with the reconnection of the UE to the target gNB (gNB-2_NW-1). UL data that is not transported by the UE during this first time period of the handover process may be queued at the UE until a connection between the UE and gNB-2_NW-1 is established, and resources are made available for transport. Additionally, DL data that is not transported by gNB-1_NW-1 during this first time period of the handover process may be queued at gNB-1_NW-1 and subsequently forwarded during the handover process to gNB-2_NW-1, for example, via the Xn/NG network connection for transport to the UE after a connection between the UE and gNB-2_NW-1 is established, and resources are made available for transport.

Consequently, immediately following completion of the handover process of the UE from gNB-1_NW-1 to gNB-2_NW-1 and a connection between the UE and gNB-2_NW-1 is established, and resources are made available for transport of data between the UE and gNB-2_NW-1, a second time period may be identified during which the data queued for transport (at the UE and gNB-2_NW-1) and the switching gaps (e.g., preconfigured by gNB-2_NW-1 for the UE) may overlap in time with respect to the same Tx/Rx resources of gNB-2_NW-1. As a consequence of this overlap, resources that could be used for the transport of queued data are instead reserved as switching gaps for the UE. Thus, the overlap may lead to inefficient allocation of resources by gNB-2_NW-1 and undesirable switching behavior by the UE if no action is taken by gNB-2_NW-1 to modify the pre-agreed behavior of the UE that allows the UE to switch to gNB-n_NW-2 during gap periods that may occur during this second time period.

An example of a scenario leading to such inefficient resource allocation by gNB-2_NW-1 and undesirable behavior by the UE may occur if the data queued for transport during the handover process has a higher priority than the switching gaps. In such a scenario, the higher priority queued data should be transported immediately during the second time period using all available resources. Accordingly, if gNB-2_NW-1 does not coordinate with the UE prior to the second time period to prevent the continued usage of pre-agreed switching gaps by the UE during the second time period, gNB-2_NW-1 may be forced to continue a reserve allocation of Tx/Rx resources for lower priority switching gaps while allocating the remaining Tx/Rx resources to clear the higher priority data queues.

For the remainder of this disclosure, the terms "suspension interval", "time interval", and/or "interval" may refer to a period of time following the completion of a handover process of a UE from a source gNB (e.g., gNB-1_NW-1) to a target gNB (e.g., gNB-2_NW-1). In some implementations, the interval may start with the establishment of a connection between the UE and the target gNB such that resources are made available for the transport of data between the UE and the target gNB, and the interval may end when the data queued at the UE and the target gNB are cleared or estimated to be cleared. During that interval, the scheduling of Tx/Rx resources by the target gNB for the UE that could be used for the transport data queued at the UE and target gNB may overlap the resources reserved for switching gaps (e.g., preconfigured by the target gNB for the UE).

Also, for the remainder of this disclosure, while the abbreviation "gNB" is employed to identify the 5G NodeB base station, this reference may also apply to a Next Generation Evolved Node-B (eNB) base station. Also, within this disclosure, the terms "terminal", "device", "User Equipment", and "UE" may be used interchangeably.

Additionally, for the remainder of this disclosure, a Multi-USIM (MUSIM) device may be presumed to be configured with a USIM-A associated with first network NW-1 (or NW-A) and a USIM-B associated with second network NW-2 (or NW-B), as illustrated in FIG. 1. However, in practice, USIM-A and USIM-B may be associated with the same network but treated by the network as independent devices with independent subscriptions. Moreover, a MUSIM application or feature of the UE may be one that interacts with the multiple USIMs on the UE. In some implementations, a processor resident in the UE (as indicated in FIG. 1) may control a "switching procedure" of the UE, as described in greater detail herein.

Figure 2A:
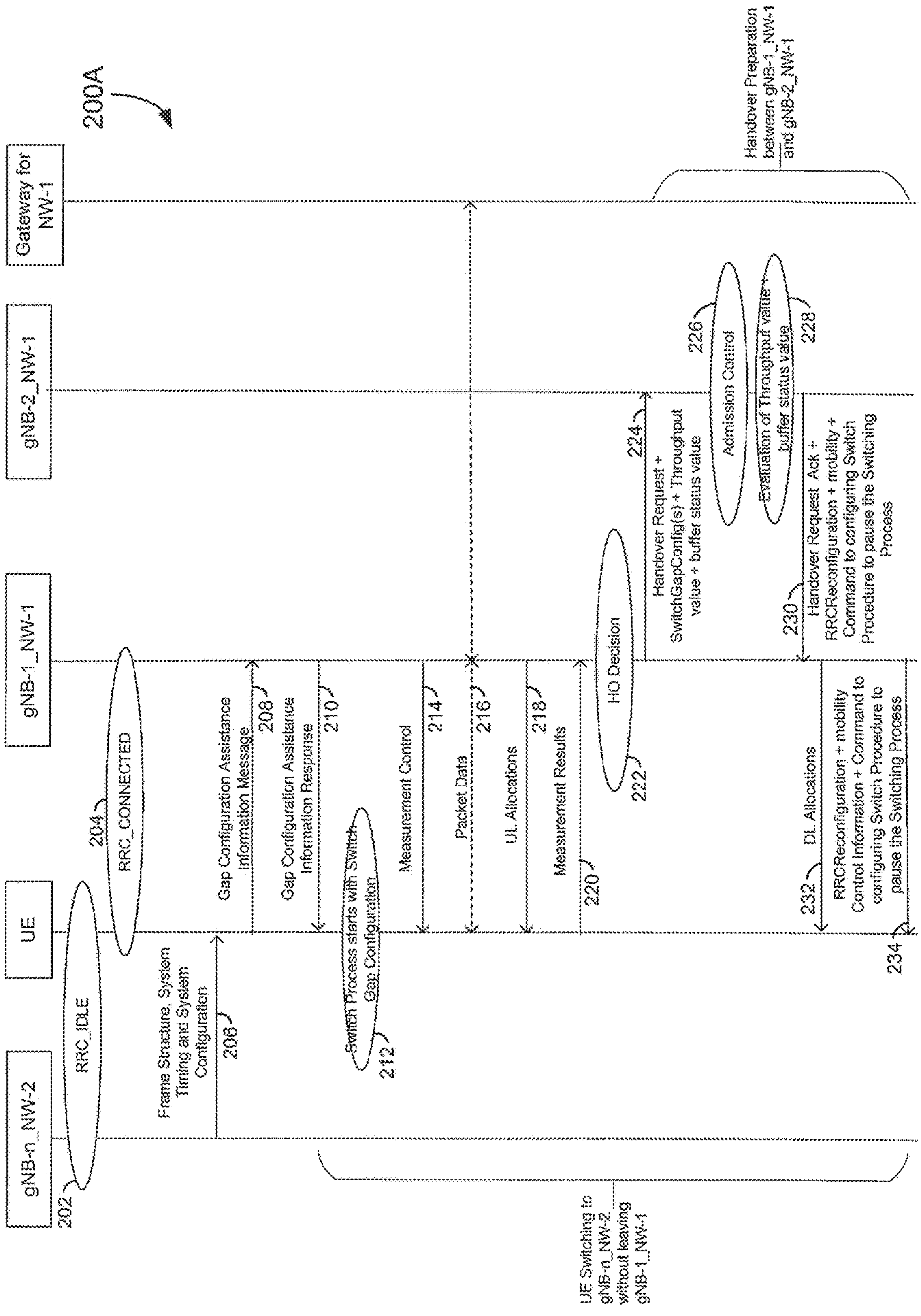
FIG. 2A illustrate a signaling diagram for pausing use of a switch gap configuration after a handover procedure between gNBs, according to an example implementation of the present disclosure.
Figure 2B:
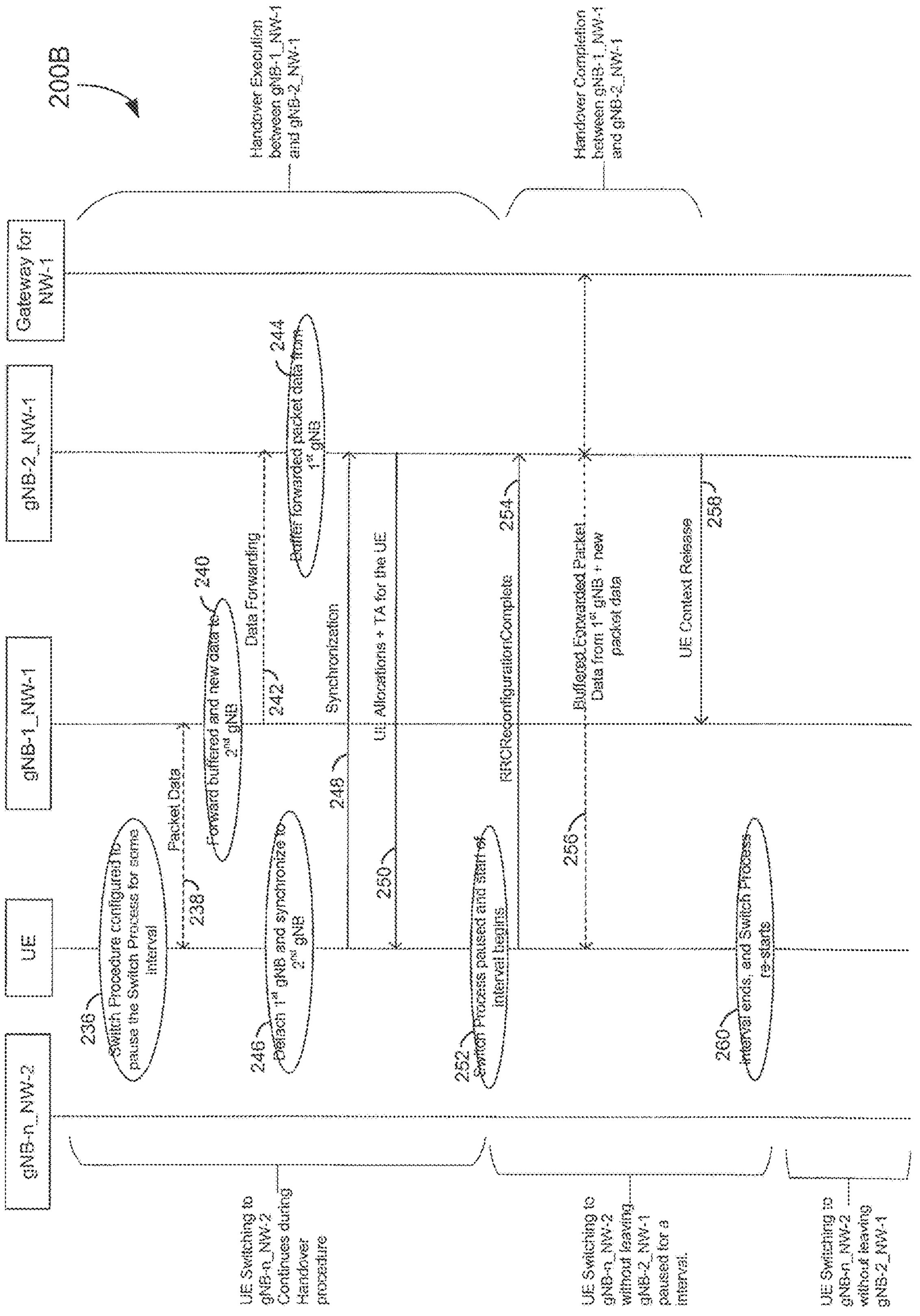
FIG. 2B illustrate a signaling diagram for pausing use of a switch gap configuration after a handover procedure between gNBs, according to an example implementation of the present disclosure.
Figure 3A:
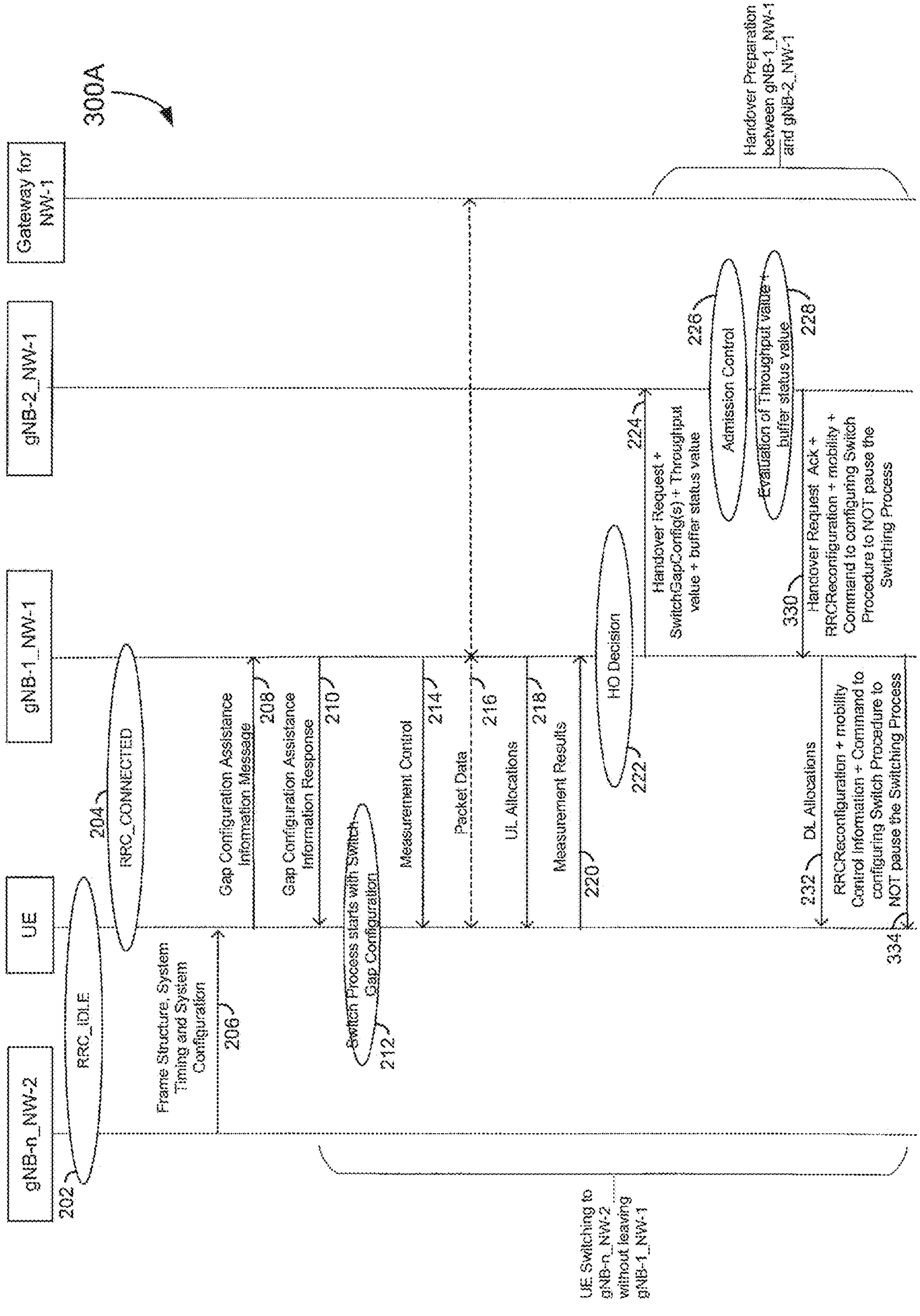
FIG. 3A illustrate a signaling diagram for not pausing use of a switch gap configuration after a handover procedure between gNBs, according to an example implementation of the present disclosure.
Figure 3B:
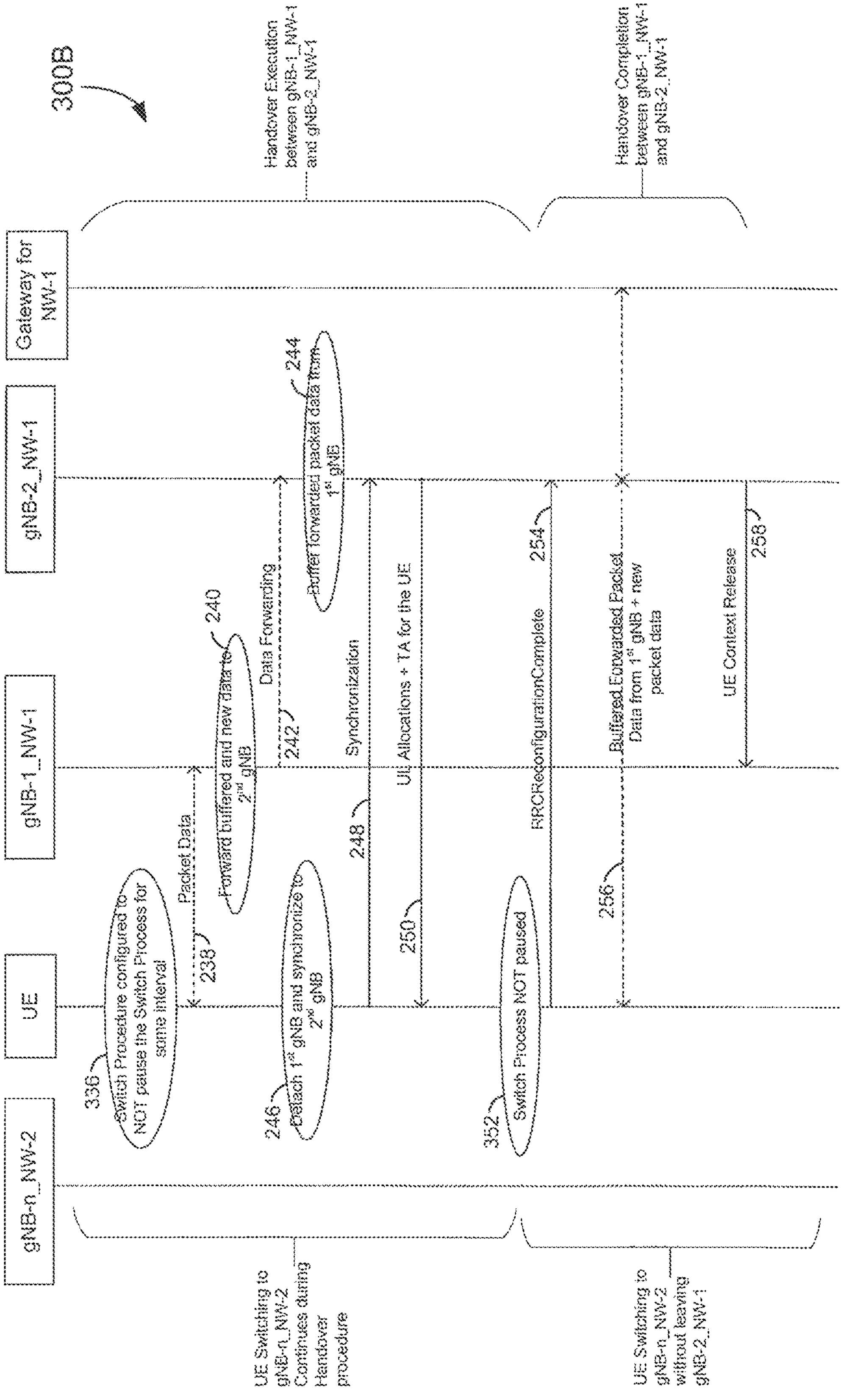
FIG. 3B illustrate a signaling diagram for not pausing use of a switch gap configuration after a handover procedure between gNBs, according to an example implementation of the present disclosure.

FIGS. 2A and 2B illustrate signaling diagram portions 200A and 200B, respectively, for pausing use of a switch gap configuration after a handover procedure between gNBs, according to an example implementation of the present disclosure. Oppositely, FIGS. 3A and 3B illustrate signaling diagram portions 300A and 300B, respectively, for not pausing use of a switch gap configuration after a handover procedure between gNBs, according to an example implementation of the present disclosure. As seen in FIGS. 2A and 3A, a first portion of communications among the UE, gNB-1_NW-1, gNB-2_NW1, a gateway for first network NW-1, and gNB-n_NW-2 at least up until an evaluation by gNB-1_NW-1 as to whether use of a switch gap configuration should be paused or suspended are substantially similar between signaling diagrams 200A and 300A.

For example, a switching procedure may be provided to enable the UE to switch between (1) the use of UL/DL time and frequency resources as scheduled by a gNB of first network NW-1 (e.g., gNB-1_NW-1) that is associated with a first USIM (USIM-A) of the UE and (2) the use of UL/DL time and frequency resources as scheduled by a gNB of second network NW-2 (e.g., gNB-n_NW-2) that is associated with a second USIM (USIM-B) of the UE while not disregarding or "missing" any time and frequency resources scheduled to the UE by gNB-1_NW-1.

In some implementations, the switching procedure may include a method for the acquisition of configuration data from gNB-1_NW-1 by way of the UE requesting such data (e.g., by sending a Gap Configuration Assistance Information message to gNB-1_NW-1), where the configuration data may be employed to control the operation of the switching procedure. The configuration data may include one or more switch gap configurations. In some implementations, the one or more switch gap configurations may identify periods of time where gNB-1_NW-1 will not schedule UL or DL time and frequency resources for the UE. Such periods of time may be used by the switching procedure to determine opportunities when the UE can network-switch from gNB-1_NW-1 to gNB-n_NW-2 for the purpose of using time and frequency resources of gNB-n_NW-2 while not missing any scheduled time and frequency resources of gNB-1_NW-1. The duration and periodicity of the timing periods of the one or more switch gap configurations, having been proposed by the UE to the gNB-1_NW-1, for example, via the Gap Configuration Assistance Information message, may be either accepted or rejected by gNB-1_NW-1.

In some implementations, as indicated in FIGS. 2A and 3A, the UE may reside in an RRC_IDLE state 202 with gNB-n_NW-2 and in an RRC_CONNECTED state 204 with gNB-1_NW-1. The proposed timing periods for gap switching may be based on the acquisition of information by the UE about the frame structure, system timing, and system configuration of gNB-n_NW-2 at operation 206. Further, in some implementations, the frame structure, system timing, and system configuration information may be based on the reception, by the UE, of the Primary Synchronization Signal (PSS) and the Secondary Synchronization Signal (SSS), and the Master Information Block (MIB), System Information Block 1 (SIB1), and System Information Block 2 (SIB2) messages broadcast by gNB-n_NW-2. The timing periods may represent occasions where gNB-n_NW-2 may schedule time and frequency resources for the UE to receive at least pages from gNB-n_NW-2.

Accordingly, in some implementations, the UE may create at least one Gap Configuration Assistance Information Message that identifies the timing periods when the UE may desire to receive pages, SIB update information, and/or other broadcast information from gNB-n_NW-2. Further, in some implementations, the UE may transmit the Gap Configuration Assistance Information Message to gNB-1_NW-1 at operation 208 via UL-DCCH-Message.UEAssistanceInformation.switchGapConfig. The gNB-1_NW-1 may respond to the Gap Configuration Assistance Information Message by transmitting to the UE at least one switch gap configuration message, for example, in a Configuration Assistance Information Response message at operation 210 (e.g., via DL-DCCH::RRCReconfiguration.OtherConfig.switchGapConfig).

In some implementations, the switching procedure may begin using the one or more switch gap configurations to determine opportunities when the UE can Switch Without Leaving gNB-1_NW-1 to receive paging and other information from gNB-n_NW-2 at operation 212. The switching procedure may be enabled to use the one or more switch gap configurations upon receipt of the RRCReconfiguration.OtherConfig message that transported the switchGapConfig IE.

The switch gap configurations that are actively in use by the switching procedure to determine opportunities when the UE can Switch Without Leaving a first network to a second network (e.g., first network NW-1 to second network NW-2) may be referred to as the "currently-jointly-in-use" one or more switch gap configurations, which indicates that a gNB is actively using the one or more switch gap configurations to create gaps in the UL/DL time and frequency resources scheduled to a UE, and the switching procedure is actively using the same one or more switch gap configurations to determine opportunities when the UE can Switch Without Leaving first network NW-1 to second network NW-1.

In various implementations described herein, as depicted in diagram portions 200A and 300A of FIGS. 2A and 3A, respectively, a method of operating the UE, gNB-1_NW-1, and gNB-2-NW-1 may enable the switching procedure of the UE to operate concurrently with a handover procedure of the UE, such that during the procedure to handover the UE from gNB-1_NW-1 to gNB-2_NW-1, the UE may continue to switch to gNB-n_NW-2. More specifically, the method may enable the continued operation of the switching procedure during and after a handover procedure of the UE, as based on the one or more switch gap configurations currently in use by the UE and the source gNB of the handover (e.g., gNB-1_NW-1), and the source gNB sharing a copy of the one or more switch gap configurations with the target gNB of the handover (e.g., gNB-2_NW-1).

In an example operation, gNB-1_NW-1 may provide to gNB-2_NW-1 a copy of the currently-jointly-in-use one or more switch gap configurations being used by the UE. In some implementations, gNB-1_NW-1 may provide the copy to gNB-2_NW-1 following a determination by gNB-1_NW-1 to hand over the UE to gNB-2_NW-1, but before gNB-1_NW-1 issues a handover command to the UE. In some implementations, gNB-1_NW-1 may render the handover decision (HO Decision at operation 222 in FIGS. 2A and 3A) based on signal measurement results transmitted from the UE to gNB-1_NW-1 at operation 220. In some implementations, the measurement results provided by the UE may be based on measurement control commands provided by gNB-1_NW-1 at operation 214, where the results may be transmitted using UL resources allocated by gNB-1_NW-1 at operation 218. These operations may continue while packet data is transferred between the UE and a gateway for network NW-1 via gNB-1_NW-1 at operation 216.

In some implementations, a benefit of providing gNB-2_NW-1 a copy of the currently-jointly-in-use one or more switch gap configurations prior to the handover is that the UE then may not have to reacquire one or more switch gap configurations from gNB-2_NW-1 via a Gap Configuration Assistance Information message sent by the UE to gNB-2_NW-1 following the handover, thus conserving time and frequency resources.

In some implementations, gNB-1_NW-1 and gNB-2_NW-1 may communicate via the Xn/NG interface to transport configuration and control data. Further, in some implementations, the transport of configuration data and control data from gNB-1_NW-1 to gNB-2_NW-1 via the Xn/NG interface in preparation for (e.g., prior to) a handover may utilize a handover request message at operation 224 (e.g., more specifically, the HANDOVER-REQUEST Message of TS 36.413). More particularly, the HANDOVER-REQUEST Message may be used for the passing of the Source-To-Target-Transparent-Container (e.g., see TS 29.280), which may be used for passing an RRC-Container, which may contain information necessary for preparing gNB-2_NW-1 to accept the handover. The Source-To-Target-Transparent-Container included in the handover request message may contain one or more switch gap configurations, possibly along with other configuration and control data. Via this mechanism, gNB-1_NW-1 may send the copy of the currently-jointly-in-use one or more switch gap configurations to indicate to gNB-2_NW-1 that gNB-1_NW-1 is providing gaps in the schedule of UL or DL time and frequency resources for the UE as defined by the one or more switch gap configurations.

In some implementations, the Source-To-Target-Transparent-Container included in the handover request message may further include information that gNB-2_NW-1 may employ to determine whether the use of gap switching, as described above, should be paused or suspended for some suspension interval after completion of the handover command. In some implementations, this information may include, but not limited to, one or more of a value indicating the UL/DL data throughput (e.g., average, maximum, or the like) between the UE and gNB-1_NW-1, a value indicating an amount of DL data intended for the UE that is buffered (e.g., currently buffered) at gNB-1_NW-1, and/or a value indicating an amount of UL data intended for gNB-1_NW-1 that is buffered (e.g., currently buffered) at the UE. Other information to facilitate a decision by gNB-2_NW-1 as to whether use of the switch gap configurations may be employed may also be included in conjunction with the handover request in other implementations.

In another example operation, the method may include gNB-2_NW-1 receiving, from gNB-1_NW-1, a copy of the currently-jointly-in-use at least one switch gap configurations, as well as the additional information described above, prior to the handover of the UE from gNB-1_NW-1 to gNB-2_NW-1. As indicated above, in some implementations, gNB-1_NW-1 and gNB-2_NW-1 may communicate via the Xn/NG interface to transport configuration and control data. Further, in some implementations, the transport of configuration data and control data from gNB-1_NW-1 to gNB-2_NW-1 via the Xn/NG interface in preparation for (e.g., prior to) a handover may use a handover request message (e.g., the HANDOVER-REQUEST Message of TS38.423). In some implementations, the HANDOVER-REQUEST Message may be used for the passing of the Source-To-Target-Transparent-Container (e.g., sec TS 29.280), which may be used for passing an RRC-Container, which may contain information necessary for preparing gNB-2_NW-1 to accept the handover. The Source-To-Target-Transparent-Container included in the handover request message may contain one or more switch gap configurations, possibly in addition to other configuration and control data (e.g., the throughput and buffered data amount values described above). Accordingly, reception by gNB-2_NW-1 of the copy of the currently-jointly-in-use one or more switch gap configurations indicates to gNB-2_NW-1 that gNB-1_NW-1 is currently providing gaps in its schedule of UL or DL time and frequency resources for the UE, as defined by the one or more switch gap configurations.

In some implementations, in response to receiving the handover request, gNB-2_NW-1 may perform admission control at operation 226 to reserve resources to facilitate communication with the UE. In some implementations, the admission control may take into account the one or more switch gap configurations received such that the UE may switch from gNB-2_NW-1 to gNB-n_NW-2 while remaining connected to gNB-2_NW-1 during and/or after the handover operation.

Additionally, at operation 228, gNB-2_NW-1 may evaluate information regarding data throughput and/or buffered data amounts received in conjunction with the handover request to determine whether a suspension interval should be imposed on the UE to facilitate the efficient, prioritized transfer of buffer data that has accumulated at the UE and/or gNB-1_NW-1 during the handover. In some implementations, gNB-2_NW-1 may evaluate one or more of the values indicating the UL/DL data throughput between the UE and gNB-1_NW-1, the value indicating the amount of DL data buffered at gNB-1_NW-1, and the value indicating the amount of UL data buffered at the UE among other values/criteria.

In some implementations, this evaluation may result in an estimation of the amount of data that will be queued at the UE and at gNB-1_NW-1 that may be forwarded to gNB-2_NW-1 upon a successful completion of the handover procedure by the UE from gNB-1_NW-1 to gNB-2_NW-1.

In some implementations, the evaluation may result in an estimation of the amount of UL/DL resources needed to clear the data estimated to be queued or buffered at the UE and at gNB-2_NW-1, where the data estimated to be queued at gNB-2_NW-1 may include an amount of data that may be forwarded from gNB-1_NW-1 and an estimated amount of data to be received directly from the gateway of NW-1 following the successful completion of the handover procedure by the UE from gNB-1_NW-1 to gNB-2_NW-1.

In some implementations, the evaluation may result in an estimated time period that may be required to transport the data estimated to be queued at UE, the data estimated to be queued at gNB-2_NW-1, and the data to be forwarded to gNB-2_NW-1 based on the estimated UL/DL resources needed to clear all of the data estimated to be queued at the UE, data estimated to be queued at gNB-2_NW-1, and data to be forwarded to gNB-2_NW-1 following the successful completion by the UE of the handover procedure from gNB-1_NW-1 to gNB-2_NW-1.

Further, in some implementations, gNB-2_NW-1 may compare the estimated time period to a threshold. Additionally, gNB-2_NW-1 may compare the priority of transporting queued data to the priority of providing the switching gaps. In some implementations, where the estimated time period exceeds the threshold, and/or the transport of queued data has a higher priority than providing the switching gaps, gNB-2_NW-1 may generate a switchSuspendIntervalValue (e.g., a timer value), where the switchSuspendIntervalValue is derived from, or is equivalent to, the interval of time (e.g., a suspension interval) needed to clear all of the data estimated to be queued at the UE, the data estimated to be queued at gNB-2_NW-1, and the data forwarded to the gNB-2_NW-1. In some implementations, where the switchSuspendIntervalValue is set to a non-zero value, the switching process of the UE is to suspend the switching process for some interval of time following the successful completion of the handover procedure of the UE from gNB-1_NW-1 to gNB-2_NW-1.

If, instead, where the estimated time period does not exceed the threshold, and/or the transport of queued data is of lower priority than providing the switching gaps, gNB-2_NW-1 may generate a switchSuspendIntervalValue indicating no suspension interval is needed (e.g., where the switchSuspendIntervalValue is set to zero). In such examples where the switchSuspendIntervalValue is set to zero (e.g., indicating no suspension interval is needed), the UE may be directed to not suspend the switching process following the successful completion of the handover procedure of the UE from gNB-1_NW-1 to gNB-2_NW-1.

Overall, in some implementations, the process by which gNB-2_NW-1 may determine whether to cause the UE to temporarily suspend gap switching operations for some suspension interval may include a number of operations:

(1) An estimation of the amount of DL data queued at gNB-2_NW-1 and the UL data queued at UE following a successful completion of the handover procedure.

(2) An estimation of the amount of UL/DL resources needed by gNB-2_NW-1 to clear the data estimated to be queued at the UE and at gNB-2_NW-1.

(3) An estimation of a time period (e.g., a suspension interval) required to transport all of the DL data queued at the gNB and all of the UL data queued at the UE.

(4) A comparison of the priority of the transportation of queued data to the priority of providing the switching gaps, as indicated by the received one or more switch gap configurations.

(5) A generation of a switchSuspendIntervalValue (e.g., a timer value) to be employed by the UE to suspend the gap switching process of the UE for some amount of time (e.g., the suspension interval) if the estimated time period exceeds a threshold and/or the priority of transportation of queued data exceeds the priority of the gap switching process.

Presuming a non-zero switchSuspendIntervalValue is generated (e.g., indicating that the gap switching process is to be temporarily suspended or paused immediately after completion of the handover procedure), as indicated in FIG. 2A, gNB-2_NW-1 may generate a command indicating the switchSuspendIntervalValue. In some implementations, the switchSuspendIntervalValue command may be included in an RRCReconfiguration message. In such implementations, the RRCReconfiguration message may (1) trigger a handover procedure in the UE and (2) reconfigure the UE as part of the handover procedure, where the handover procedure includes gNB-2_NW-1 as the target gNB and gNB-1_NW-1 as the source gNB of the handover.

Presuming, instead, that a zero switchSuspendIntervalValue is generated (e.g., indicating that the gap switching process is not to be temporarily suspended or paused after completion of the handover procedure), as indicated in FIG. 3A, gNB-2_NW-1 may generate a command indicating the switchSuspendIntervalValue of zero. In some implementations, the switchSuspendIntervalValue command may be included in an RRCReconfiguration message. In the alternative, the lack of a switchSuspendIntervalValue included in an RRCReconfiguration message may be interpreted as preventing or disabling a pause or suspension in the gap switching process after completion of the handover procedure. In such implementations, the RRCReconfiguration message may (1) trigger a handover procedure in the UE and (2) reconfigure the UE as part of the handover procedure, where the handover procedure includes gNB-2_NW-1 as the target gNB and gNB-1_NW-1 as the source gNB of the handover.

In some implementations, gNB-2_NW-1 may send the generated RRCReconfiguration message (e.g., possibly including the switchSuspendIntervalValue command to configure the switching procedure of the UE) to gNB-1_NW-1 at operation 230 of FIG. 2A (e.g., if the switchSuspendIntervalValue command is non-zero) or at operation 330 of FIG. 3A (e.g., if the switchSuspendIntervalValue command is zero or is not included in the RRCReconfiguration message). In some implementations, gNB-1_NW-1 and gNB-2_NW-1 may communicate the RRCReconfiguration message via the Xn/NG interface to transport configuration and control data. Further, in some implementations, the transport of configuration and control data from gNB-1_NW-1 to gNB-2_NW-1 via the Xn/NG interface in preparation for (e.g., prior to) a handover may use a handover request acknowledgment message (e.g., the HANDOVER-REQUEST-ACKNOWLEDGE Message of TS 36.413). In some implementations, the HANDOVER-REQUEST-ACKNOWLEDGE message may be sent in response to a HANDOVER-REQUEST message. In some implementations, the HANDOVER-REQUEST-ACKNOWLEDGE Message may be used for the passing of the Target-To-Source-Transparent-Container (e.g., see TS 29.280), which may be used for passing an RRC-Container, which may contain an RRCReconfiguration message (e.g., the RRCReconfiguration message prepared by the target gNB of the handover, gNB-2_NW-1, and delivered to the UE by the source gNB of the handover, gNB-1_NW-1). In turn, in some implementations, the RRCReconfiguration message may carry an otherConfig IE (described in greater detail below), which may carry the command that configures the switching process of the UE, possibly including the switchSuspendIntervalValue command.

In response to receiving the RRCReconfiguration message, gNB-1_NW-1 may allocate DL resources to the UE to provide information to the UE regarding the handover and the gap switching process at operation 232 of FIGS. 2A and 3A. Also, in some implementations, gNB-1_NW-1 may forward, to the UE, the RRCReconfiguration message that was received from gNB-2_NW-1. In some implementations, the RRCReconfiguration message may include a command (e.g., a command carried in the otherConfig IE, such as the switchSuspendIntervalValue command) that configures the switching procedure of the UE. More specifically, the RRCReconfiguration message may include a non-zero switchSuspendIntervalValue command to temporarily suspend the switching process at the UE after completion of the handover process (at operation 234 of FIG. 2A) or may include a zero switchSuspendIntervalValue command or may not include a switchSuspendIntervalValue command (at operation 334 of FIG. 3A). In some implementations, gNB-1_NW-1 may use the PDSCH physical channel to transport data to the UE. Moreover, in some implementations, the PDSCH physical channel may use the Downlink Shared Channel (DL-SCH) transport channel, and the DL-SCH transport channel may use the Dedicated Control Channel (DCCH) logical channel. Also, in some implementations, the DCCH logical channel may carry the RRCReconfiguration message that includes a command that configures the switching procedure of the UE.

Now referring to FIGS. 2B and 3B, after the UE receives the RRCReconfiguration message from gNB-1_NW-1, the UE may configure its gap switching procedure based on the message. In some implementations, in response to receiving an RRCReconfiguration message with a non-zero switchSuspendIntervalValue command at operation 234 of FIG. 2A, the UE may configure its switching procedure to pause or suspend the switching process after completion of the handover procedure for a suspension interval indicated by the switchSuspendIntervalValue at operation 236 of FIG. 2B. In response to receiving an RRCReconfiguration message with a zero switchSuspendIntervalValue command or without a switchSuspendIntervalValue command at operation 334 of FIG. 3A, the UE may instead configure its switching procedure to not pause or suspend the switching process after completion of the handover procedure at operation 336 of FIG. 3B. In some implementations, the effect of the switchSuspendIntervalValue command occurs after the handover procedure is completed.

During the handover procedure, as depicted in FIGS. 2B and 3B, the UE may continue the switching procedure, as indicated by the one or more switch gap configurations. Also, during the handover procedure, packet data may be transferred until the UE disconnects from gNB-1_NW-1, after which gNB-1_NW-1 may forward currently buffered data and newly received data destined for the UE to gNB-1_NW-1 at operations 240 and 242, where the data may be temporarily buffered at operation 244. During these forwarding and buffering operations, the UE may be disconnecting from gNB-1_NW-1 and connecting to gNB-2_NW-1 at operation 246. To facilitate connection with gNB-2_NW-1, the UE may synchronize itself with the signal timing of gNB-2_NW-1 at operation 248, and gNB-2_NW-1 may allocate UL resources and specify a Timing Advance for the UE at operation 250 to facilitate synchronization of UL data with gNB-2_NW-1.

Upon completion of the handover procedure, based on the switch procedure configuration performed by the UE (at operation 236 of FIG. 2B or operation 336 of FIG. 3B), as described above, the UE may either suspend the switching procedure for a suspension interval at operation 252 of FIG. 2B (e.g., as determined by a non-zero switchSuspendIntervalValue command) or allow the switching procedure that was executed through the handover procedure to continue without pause at operation 352 of FIG. 3B (e.g., as determined by a zero switchSuspendIntervalValue command or the absence of a switchSuspendIntervalValue command). In addition, the UE may transmit an RRCReconfigurationComplete message to gNB-2_NW-1 at operation 254, signifying successful completion of the handover procedure to the gNB-2_NW-1.

Further, in FIG. 2B, while the switching procedure is paused, gNB-2_NW-1 may forward previously buffered data and newly arrived data to the UE at operation 256. After completion of these data forwarding tasks, gNB-2_NW-1 may indicate a UE context release to gNB-1_NW-1 at operation 258 to indicate to gNB-1_NW-1 that the UE was successfully handed over to gNB-2_NW-1. After expiration of the suspension interval, the UE may restart the switching process with gNB-n_NW-1 at operation 260.

In the case that the switching has not been paused after completion of the handover procedure, as illustrated in FIG. 3B, gNB-2_NW-1 may still forward previously buffered data and newly arrived data to the UE at operation 256 (e.g., by way of resources that are not being employed by the UE to switch to gNB-n_NW-1). After completion of these data forwarding tasks, gNB-2_NW-1 may indicate a UE context release to gNB-1_NW-1 at operation 258 to indicate to gNB-1_NW-1 that the UE was successfully handed over to gNB-2_NW-1 while the UE continues the switching process, as provided by the one or more switch gap configurations.

Figure 4A:
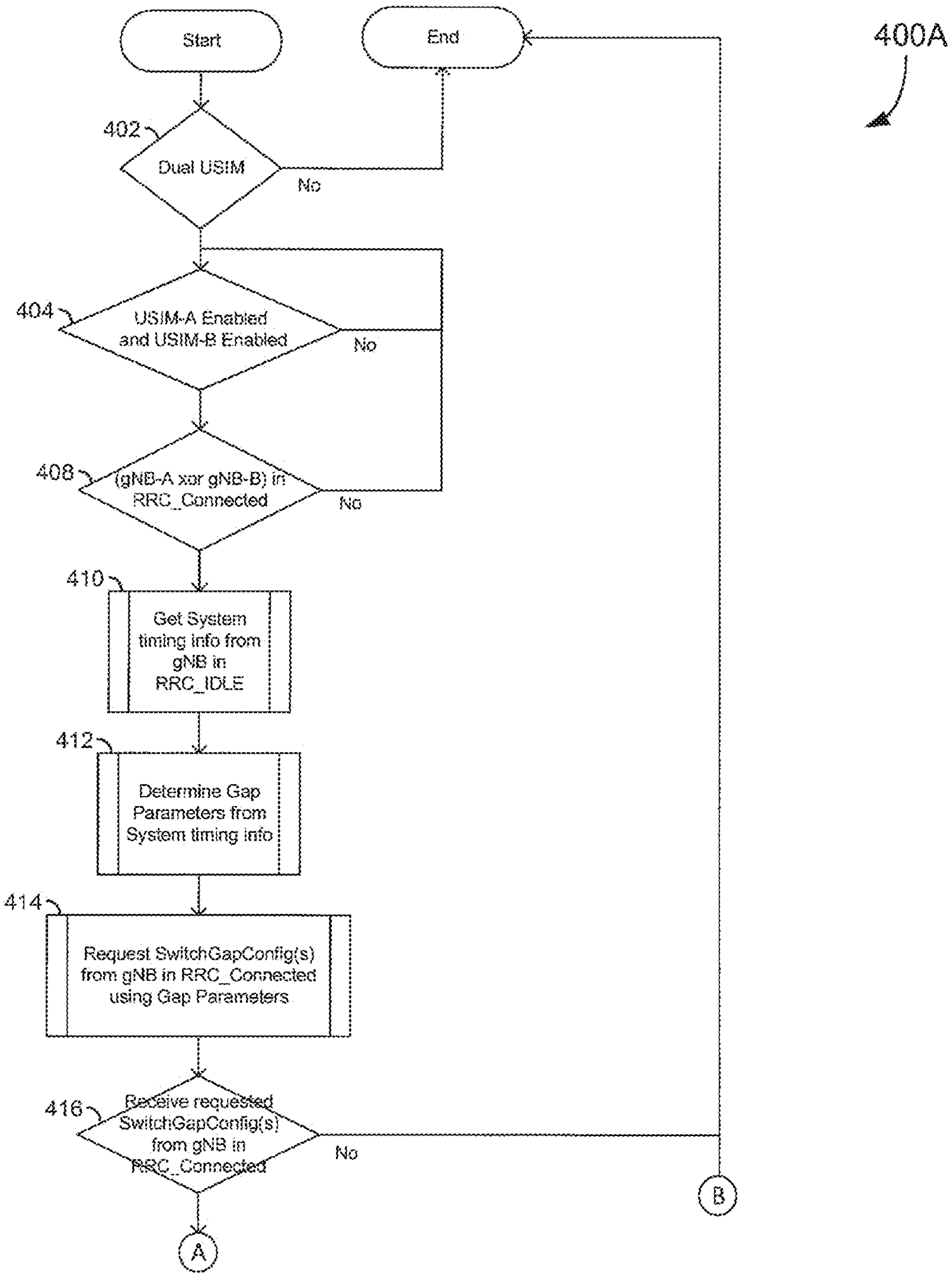
FIG. 4A illustrates a flow diagram of a method for a UE to facilitate a pause of a switching procedure after a handover procedure, according to an example implementation of the present disclosure.
Figure 4B:
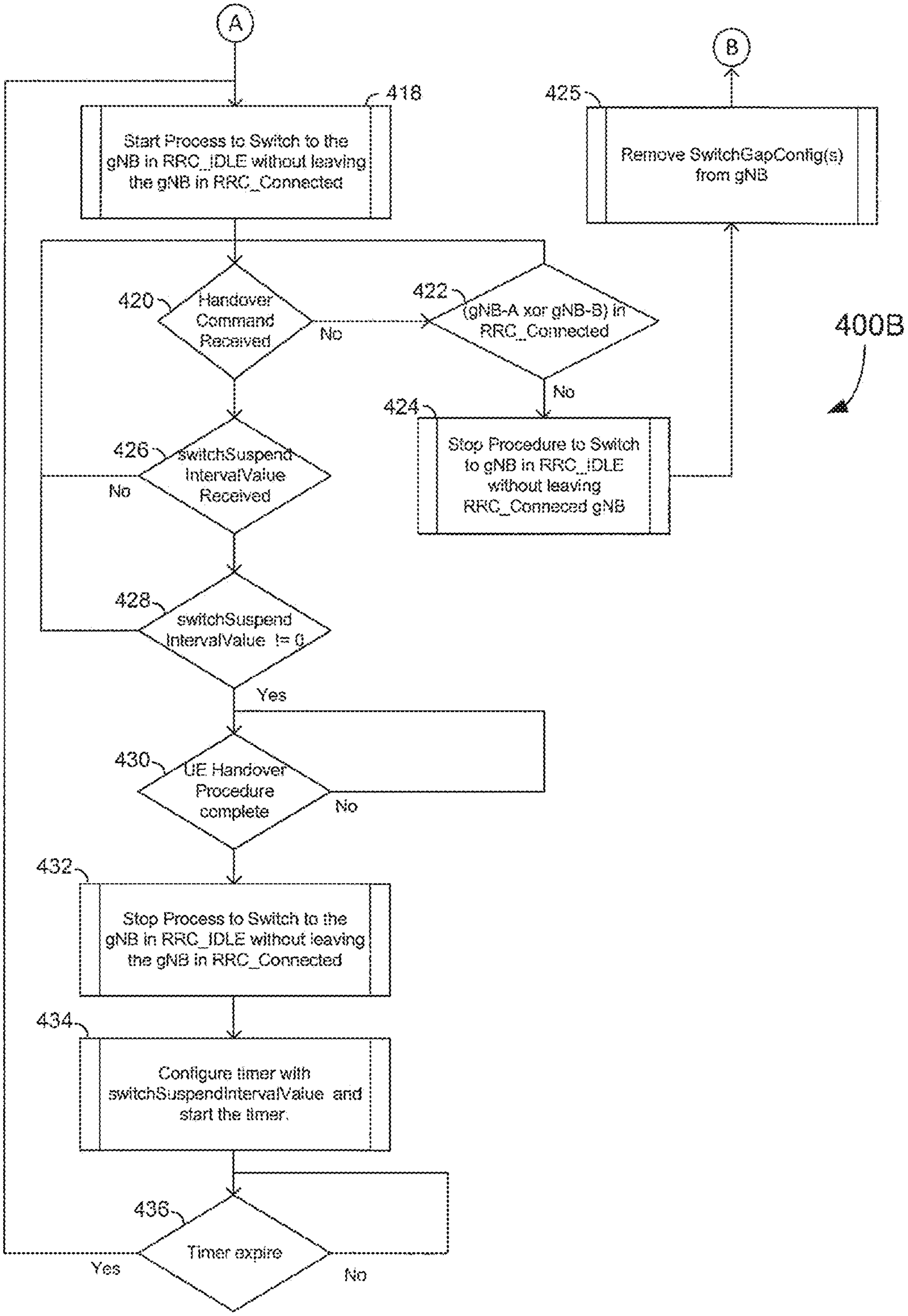
FIG. 4B illustrates a flow diagram of a method for a UE to facilitate a pause of a switching procedure after a handover procedure, according to an example implementation of the present disclosure.

FIGS. 4A and 4B illustrate a flow diagram of method portions 400A and 400B for a UE to facilitate a pause of a gap switching procedure after a handover procedure, according to an example implementation of the present disclosure. In some implementations, fewer than all of the operations depicted in FIGS. 4A and 4B may be executed. Also, in some implementations, some of the operations in FIG. 4 may be executed in association with each handover, while some of the operations may be executed less often than with each handover.

In method portion 400A of FIG. 4A, at operation 402, a determination may be made as to whether the UE is configured with MUSIM (e.g., dual USIM) capability. If not so configured, then method 400 may end. Otherwise, the UE may proceed to operation 404.

Collectively, operations 404 and 408 may confirm whether various conditions of the UE have been met before proceeding to the remainder of method portion 400A. For example, at operation 404, a determination may be made as to whether both USIM-A and USIM-B are enabled (e.g., in a state in which both USIM-A and USIM-B each may be used to access an associated network). If either USIM-A or USIM-B, or both, are disabled, method portion 400A may continue to execute operation 404 until both USIM-A and USIM-B are enabled. At operation 408, a determination may be made as to whether the UE has established a connected state (e.g., RRC_CONNECTED) with a base station of a network associated with either USIM-A (e.g., referred to in FIG. 4 as gNB-A) or USIM-B (e.g., referred to in FIG. 4 as gNB-B), but not both (e.g., as indicated by the exclusive-OR ("xor") operation depicted in operation 408 of FIG. 4). If the UE has established a connected state with a gNB of a network associated with either USIM-A or USIM-B, but not both, then the UE may proceed to operation 410. For example, the UE may be in an RRC_CONNECTED state with gNB-A and in an RRC_IDLE state with gNB-B, or vice versa. Otherwise, control may return to operation 404.

At operation 410, the UE may obtain system timing information from the gNB with which the UE is in an RRC_IDLE state. In some implementations, the system timing information may include the frame structure, system timing, and/or system configuration information based on the UE's reception of PSS, SSS, MIB, SIB1, and/or SIB2 messages broadcast by the gNB in the RRC_IDLE state with the UE. At operation 412, the UE may determine a set of gap parameters from the obtained system timing information.

At operation 414, the UE may generate and transmit a request to the gNB with which the UE is in the RRC_CONNECTED state for one or more switch gap configurations based on the gap parameters. At operation 416, the UE, in response to the previously transmitted request, may receive the requested one or more switch gap configurations from the gNB with which the UE is in the RRC_CONNECTED state and then proceed to operation 418 of FIG. 4B. In some implementations, if the UE does not receive the requested switch gap configurations, method 400 may end, or may return to operation 404.

In method portion 400B of FIG. 4B, at operation 418, the UE may initiate a switching procedure that determines opportunities for the UE to switch to the gNB with which the UE is in the RRC_IDLE state, based on the received one or more switch gap configurations, without leaving the gNB with which the UE is in the RRC_CONNECTED state.

At operation 420, the UE may determine whether a handover command has been received (e.g., while the switching procedure of operation 418 is operating). If a handover command has not been received, the UE may proceed to operation 422. At operation 422, if the UE is in an RRC_CONNECTED state with either gNB-A or gNB-B, but not both (e.g., in a manner similar to operation 408), the UE may continue to wait for a handover command at operation 420 (e.g., while the switching procedure of operation 418 continues). Otherwise, the UE may proceed to operation 424, where the UE may stop the ongoing switching procedure, and to operation 425, where the UE may remove or cancel the switch gap configurations (e.g., from the gNB with which the UE was in an RRC_CONNECTED state), at which point method portion 400B may terminate.

If, instead, at operation 420, the handover command has been received, the UE may proceed to operation 426. At operation 426, the UE may determine whether the message that transported the handover command to the UE also transported a switchSuspendIntervalValue command. If the message did not include a switchSuspendIntervalValue command, the UE may return to operation 420 and may continue the switching procedure to switch to the gNB with which the UE is in the RRC_IDLE state without leaving the gNB with which the UE is in the RRC_CONNECTED state. If, instead, the message includes a switchSuspendIntervalValue command, the UE may proceed to operation 428. At operation 428, the UE may determine whether the switchSuspendIntervalValue command has a value of zero. If the switchSuspendIntervalValue command has a value of zero, the UE may return to operation 420 and may continue the switching procedure to switch to the gNB with which the UE is in the RRC_IDLE state without leaving the gNB with which the UE is in the RRC_CONNECTED state.

If the switchSuspendIntervalValue command has a nonzero value (at operation 428), the UE may proceed to operation 430. At operation 430, the UE may await completion of the handover procedure, at which time the UE may proceed to operation 432. At operation 432, the UE may suspend or pause the switching process to the gNB with which the UE is in the RRC_IDLE state. At operation 434, the UE may then configure a timer with the received switchSuspendIntervalValue and start the timer. Thereafter, at operation 436, the UE may await the expiration of the timer. When the timer expires, the UE may proceed to operation 418, where the UE may once again restart the switching process to the gNB with which the UE is in the RRC_IDLE state (e.g., according to the one or more switch gap configurations).

Figure 5:
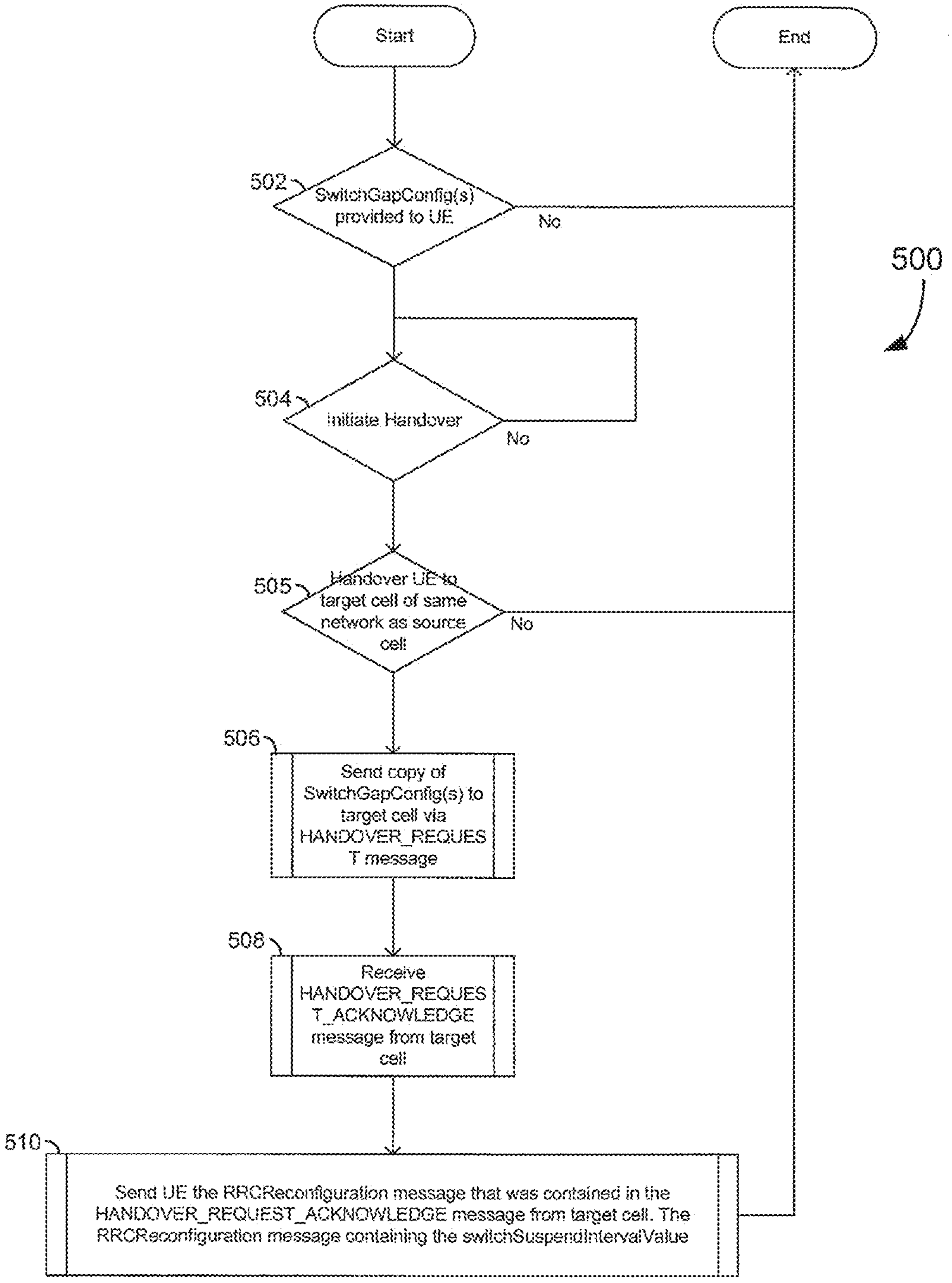
FIG. 5 illustrates a flow diagram of a method for a source gNB to facilitate a pause of a switching procedure after a handover procedure, according to an example implementation of the present disclosure.

FIG. 5 illustrates a flow diagram of a method 500 for a source gNB to facilitate a pause of a switching procedure after a handover procedure, according to an example implementation of the present disclosure. In method 500, at operation 502, the source gNB may determine whether the source gNB has provided one or more switch gap configurations to the UE. If not, method 500 may end. Otherwise, method 500 may proceed to operation 504. At operation 504, the source gNB may determine whether a handover operation of the UE to a target gNB of the same network as the source gNB should be performed. If not, the source gNB may make the same determination (e.g., repeatedly) until such a handover is to be initiated, at which point method 500 may proceed to operation 505.

At operation 505, the source gNB may initiate the desired handover and determine whether the target gNB of the handover belongs to the same network as the source gNB. If not, the source gNB may exit method 500. Otherwise, the source gNB may proceed to operation 506.

At operation 506, the source gNB may transport, to the target gNB, a copy of the one or more switch gap configurations previously provided to the UE. In some implementations, the copy of the one or more switch gap configurations may be provided to the target gNB by way of a HANDOVER-REQUEST message to initiate the handover operation. In some implementations, the one or more switch gap configurations may be accompanied by information regarding current or previous data throughput and/or buffered data amounts, as described above. Method 500 may then proceed to operation 508.

At operation 508, the source gNB may receive a HANDOVER-REQUEST-ACKNOWLEDGE message from the target gNB in response to the earlier HANDOVER-REQUEST from the source gNB. At operation 510, the source gNB may transport, to the UE, an RRCReconfiguration message that was contained in the received HANDOVER-REQUEST-ACKNOWLEDGE message. As discussed above, the RRCReconfiguration message may include a switchSuspendIntervalValue command. Method 500 may then terminate.

Figure 6:
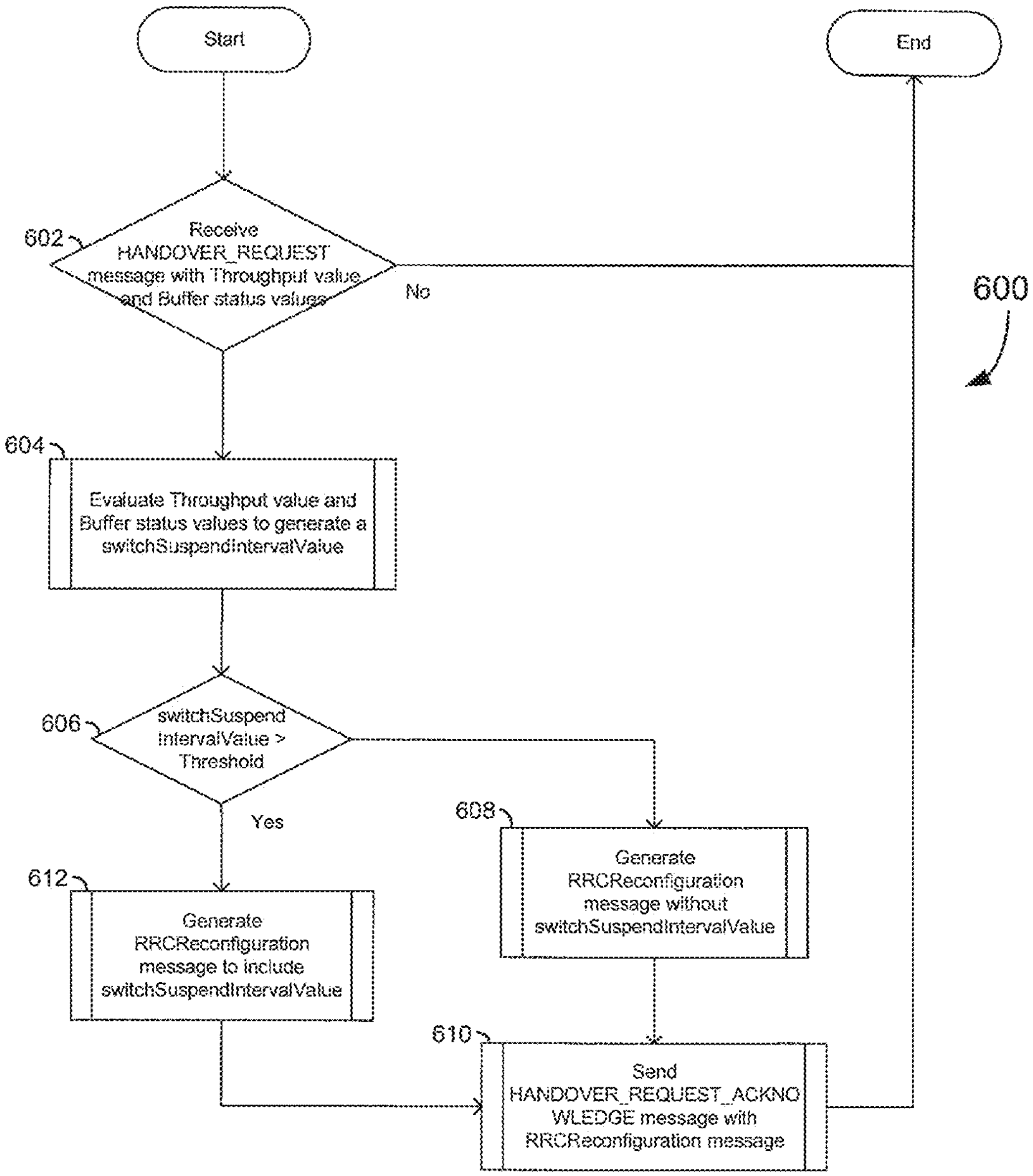
FIG. 6 illustrates a flow diagram of a method for a target gNB to facilitate a pause of a switching procedure after a handover procedure, according to an example implementation of the present disclosure.

FIG. 6 illustrates a flow diagram of a method 600 for a target gNB to facilitate a pause of a switching procedure after a handover procedure, according to an example implementation of the present disclosure. In method 600, at operation 602, the target gNB may receive, from a source gNB, a HANDOVER-REQUEST message to hand over a UE, where one or more switch gap configurations may be transported with the HANDOVER-REQUEST message. In some implementations, the HANDOVER-REQUEST message may include information regarding data throughput and/or buffered data amounts received in conjunction with the handover request. Such information may include, but is not limited to, one or more of a value indicating the UL/DL data throughput between the UE and the source gNB, a value indicating an amount of DL data intended for the UE that is buffered at the source gNB, and/or a value indicating an amount of UL data intended for the source gNB that is buffered at the UE. In some implementations, the reception of the HANDOVER-REQUEST message may correspond to operation 506 of FIG. 5.

At operation 604, the target gNB may evaluate the data throughput, the amount of data buffered, and/or other information received to generate a possible suspension interval value (e.g., a timer value, such as a switchSuspendIntervalValue) during which the UE may suspend or pause, for some interval, the switching procedure being used by the UE (e.g., in accordance with the one or more switch gap configurations) after completion of the handover procedure.

At operation 606, the target gNB may then compare the generated suspension interval value to some threshold value. If the generated suspension interval value is greater than the threshold, the target gNB may proceed to operation 612. At operation 612, the target gNB may generate an RRCReconfiguration message that includes a switchSuspendIntervalValue command that indicates the generated suspension interval value. Further, at operation 610, the target gNB may transmit, to the source gNB in response to the HANDOVER-REQUEST message, a HANDOVER-REQUEST-ACKNOWLEDGE message that includes the generated RRCReconfiguration message. Thereafter, method 600 may terminate.

If, instead, at operation 606, the generated suspension interval value is less than or equal to the threshold, the target gNB may proceed to operation 608. At operation 608, the target gNB may generate an RRCReconfiguration message that does not include a switchSuspendIntervalValue command. Alternately at operation 608, in some implementations, the target gNB may generate an RRCReconfiguration message that includes a switchSuspendIntervalValue of zero. Further, at operation 610, the target gNB may transmit, to the source gNB in response to the HANDOVER-REQUEST message, a HANDOVER-REQUEST-ACKNOWLEDGE message that includes the generated RRCReconfiguration message, after which method 600 may terminate.

FIG. 7 illustrates an example of a new Other Configuration (otherConfig) information element (IE), according to an example implementation of the present disclosure. As depicted in FIG. 7, the otherConfig IE may include a new command, switchSuspendIntervalValue (indicated in bold font in FIG. 7). In some implementations, the otherConfig IE is intended to be carried by the RRCReconfiguration message for triggering a handover of the UE from a source gNB of a first network to the target gNB of the first network. As described above, the switchSuspendIntervalValue command, when transported from the source gNB to the UE, may enable the switching procedure of the UE to be paused or suspended for a time period (e.g., a suspension interval) indicated by switchSuspendIntervalValue (e.g., an integer used as a timer value) following the completion of the handover procedure by the UE. After expiration of the suspension interval, the UE may resume use of the currently-jointly-in-use one or more switch gap configurations to determine opportunities when the UE may Switch Without Leaving the target gNB or the source gNB to receive paging and other information from a gNB of a second network during and after the handover procedure. In some implementations, the switchSuspendIntervalValue may be defined within the otherConfig IE as "a non-zero value enabling the UE to configure the Switch Process to be suspended immediately after handover completion, and an interval of time for how long the Switch Process should be suspended after the handover completion."

FIGS. 8A and 8B illustrate an example of a new RRC Reconfiguration (RRCReconfiguration) IE, according to an example implementation of the present application. In some implementations, the new RRCReconfiguration IE that includes the switchSuspendIntervalValue command via the new otherConfig IE, as indicated in FIG. 7, is illustrated in bold font in FIG. 8B. Generally, the RRCReconfiguration message may modify an RRC connection. In some implementations, the RRCReconfiguration message may convey information for measurement configuration, mobility control, radio resource configuration (e.g., including Resource Blocks (RBs), Media Access Control (MAC) main configuration, and physical (PHY) channel configuration), Access Stratum (AS) security configuration, and so on.

FIG. 9 illustrates an example of a new RRC Multiplicity and Type Constraint definition (maxSwitchSuspendIntervalValue), according to an example implementation of the present disclosure. In some implementations, the target gNB may limit the switchSuspendIntervalValue that may ultimately be included in RRCReconfiguration message, as shown in the definition of the switchSuspendIntervalValue, as depicted in FIG. 7. In some implementations, as indicated in FIG. 9, maxSwitchSuspendIntervalValue may be an integer equal to 1000, which may represent a maximum timer value for a timer with a particular timing resolution.

The following example describes what operations the NR UE may perform upon reception of an RRCReconfiguration message with an otherConfig message that includes a new IE switchSuspendIntervalValue-r17, as an addition to the existing text in TS 38.331 (e.g., at Sections 5.3.5.3 and 5.3.5.9, with reference to Conditional Handover (CHO) and Conditional Primary Secondary Cell (PSCell) Change (CPC)):

5.3.5.3 Upon receiving of the RRCReconfiguration, or upon execution of the conditional reconfiguration (CHO or CPC):

1> if the RRCReconfiguration is applied due to a conditional reconfiguration execution upon cell selection performed while timer T311 was running, as defined in 5.3.7.3:

2> remove all the entries within VarConditionalReconfig, if any;

( . . . Text removed for brevity . . . )

1> if the RRCReconfiguration message includes the otherConfig:

2> perform the other configuration procedure as specified in 5.3.5.9;

( . . . Remaining text of 5.3.5.3 removed for brevity . . . )

5.3.5.9 Other configuration

The UE shall:

1> if the received otherConfig includes the delayBudgetReportingConfig:

2> if delayBudgetReportingConfig is set to setup:

3> consider itself to be configured to send delay budget reports in accordance with 5.7.4;

2> else:

3> consider itself not to be configured to send delay budget reports and stop timer T342, if running.

1> if the received otherConfig includes the switchSuspendIntervalValue:

2> consider itself to be configured to suspend the Switch Process immediately after handover, for a duration as indicated by the value;

1> else:

2> consider itself to be configured to not suspend the Switch Process immediately after handover;

( . . . Remaining text of 5.3.5.9 removed for brevity . . . )

What is claimed is:

1. A base station (BS) of a first network, the BS comprising:

at least one non-transitory computer-readable medium storing one or more computer-executable instructions; and at least one processor coupled to the at least one non-transitory computer-readable medium and configured to execute the one or more computer-executable instructions to cause the BS to:

maintain a first radio resource control (RRC) connection with a user equipment (UE) while facilitating gaps in communication with the UE according to a switch gap configuration;

transmit, to the UE, an RRC reconfiguration message comprising a first command and a second command, the first command instructing the UE to begin a handover procedure from the BS of the first network to another BS of the first network, and the second command controlling usage of the switch gap configuration by the UE following completion of the handover procedure;

transmit, to the other BS, a handover request message comprising the switch gap configuration; and in response to transmitting the handover request message, receive, from the other BS, a handover request acknowledgment message comprising the first command and the second command, wherein the handover request message further comprises at least one of:

a throughput value indicating data throughput between the BS and the UE, a BS buffer value indicating an amount of downlink (DL) data buffered at the BS for the UE, or a UE buffer value indicating an amount of uplink (UL) data buffered at the UE for the BS.

2. The BS of claim 1, wherein the handover request acknowledgment message comprises an RRCReconfiguration message including the first command and the second command.

3. A base station (BS) of a first network, the BS comprising:

at least one non-transitory computer-readable medium storing one or more computer-executable instructions; and at least one processor coupled to the at least one non-transitory computer-readable medium and configured to execute the one or more computer-executable instructions to cause the BS to:

receive, from another BS of the first network, a handover request message for a user equipment (UE), the handover request message comprising a switch gap configuration that specifies at least one time period during which the UE receives transmissions from a BS of a second network;

generate a radio resource control (RRC) reconfiguration message comprising a first command and a second command, the first command instructing the UE to begin a handover procedure from the other BS of the first network to the BS of the first network, and the second command controlling usage of the switch gap configuration by the UE following completion of the handover procedure; and transmit, to the other BS, a handover request acknowledgment message comprising the RRC reconfiguration message, wherein the handover request message further comprises at least one of:

a throughput value indicating data throughput between the other BS and the UE, a BS buffer value indicating an amount of downlink (DL) data buffered at the other BS for the UE, or a UE buffer value indicating an amount of uplink (UL) data buffered at the UE for the other BS.

4. The BS of claim 3, wherein:

the second command suspends continued usage of the switch gap configuration during a time interval following the completion of the handover procedure, and the time interval is based on at least one of the throughput value, the BS buffer value, or the UE buffer value.

* * * * *